United States Patent [19]

Kishino et al.

[11] 3,760,043

[45] Sept. 18, 1973

[54] O-PHENYL-S-ALKYL-N-ALKYL-PHOSPHOROAMIDO-THIOLATES

[75] Inventors: Shigeo Kishino; Yasuo Yamada; Shizuo Higashikawa; Akio Kudamatsu; Tatsuo Tamura; Shozo Sumi; Osamu Katsumata, all of Tokyo, Japan

[73] Assignee: Bayer Aktiengesellschaft, Leverkusen, Germany

[22] Filed: Mar. 27, 1970

[21] Appl. No.: 23,510

[30] Foreign Application Priority Data
Mar. 27, 1969 Japan.................................. 44/22714

[52] U.S. Cl................ 260/951, 260/956, 260/958, 260/959, 260/949, 424/217, 424/219, 424/220
[51] Int. Cl........................... C07f 9/24, A01n 9/36
[58] Field of Search..................... 260/951, 956, 958, 260/959

[56] References Cited
UNITED STATES PATENTS

| | | | |
|---|---|---|---|
| 2,552,540 | 5/1951 | Drake et al. | 260/951 |
| 2,855,422 | 10/1958 | Kauer et al. | 260/959 |
| 2,855,425 | 10/1958 | Tolkmith et al. | 260/958 |
| 3,081,329 | 3/1963 | Vegter | 260/956 |

Primary Examiner—Lewis Gotts
Assistant Examiner—Anton H. Sutto
Attorney—Burgess, Dinklage and Sprung

[57] ABSTRACT

O-Phenyl-S-alkyl-N-alkyl-phosphoroamido-thiolates, i.e. O-[(optionally mono to tri halo and/or optionally mono to di alkyl and alkoxy -substituted)-phenyl]-S-(alkyl, alkenyl, alkynyl, chloroalkyl and phenylalkyl)-N-(alkyl and -phosphoroamido-thiolates or -amido-thiolphosphoric acid esters, which possess fungicidal, acaricidal and insecticidal, as well as nematocidal properties and which may be produced by conventional methods.

19 Claims, No Drawings

O-PHENYL-S-ALKYL-N-ALKYL-PHOSPHOROAMIDO-THIOLATES

The present invention relates to and has for its objects the provision for particular new O-phenyl-S-alkyl-N-alkyl-phosphoramido-thiolates, i.e. O-[(optionally mono to tri halo and/or optionally mono to di alkyl and alkoxy -substituted)-phenyl]-S-(alkyl, alkenyl, alkynyl, chloroalkyl and phenyl-alkyl)-N-(alkyl and cycloalkyl)-phosphoroamido-thiolates or -amido-thiolphosphoric acid esters, which possess fungicidal, acaricidal and insecticidal, as well as nematocidal properties, active compositions in the form of mixtures of such compounds with solid and liquid dispersible carrier vehicles, and methods for producing such compounds and for using such compounds in a new way, especially for combating fungi, arthropods, e.g. acarids and insects, as well as nematodes, and the like, with other and further objects becoming apparent from a study of the within specification and accompanying examples.

It is already known that O,O-diisopropyl-S-benzyl-phosphoro-thiolate (A) can be used as a fungicide to control rice diseases, such as blast and sheath blight.

It is also known that N-(β-cyano-ethyl)-monochloroacetamide (B), which may be designated Udonkol, can be used as a fungicide to combat powdery mildew fungi.

Furthermore, it is known that formulations such as mixtures of parachlorophenyl-parachlorobenzene sulfonate and bis-(parachlorophenoxy)-methone (C), which may be designated Neosappiran W.P., as well as O,O-diethyl-S-(2,5-dichloro-phenyl-mercaptomethyl)-dithiophosphate (D), can be used for acaricidal and insecticidal purposes.

Dibromomonochloro-propane (E), which may be designated DBCD, is also known to be usable for combating nematodes.

It has now been found, in accordance with the present invention, that the particular new O-phenyl-S-alkyl-N-alkyl-phosphoramido-thioates of the formula

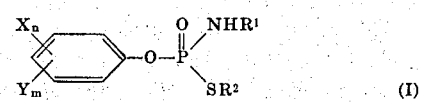

in which
$R^1$ is alkyl of one to six carbon atoms, or cycloalkyl of five to six ring carbon atoms,
$R^2$ is alkyl of one to six carbon atoms, alkenyl of two to six carbon atoms, alkynyl of two to six carbon atoms, chloro-alkyl of one to six carbon atoms, or phenyl-alkyl having one to two carbon atoms in the alkyl moiety,
X is hydrogen, or halo,
Y is hydrogen, alkyl of one to four carbon atoms, or alkoxy of one to four carbon atoms,
$n$ is a whole number from 1 to 3, and
$m$ is a whole number from 1 to 2,
exhibit strong, especially selective, fungicidal, acaricidal, insecticidal and nematocidal properties.

It has been furthermore found, in accordance with the present invention, that the compounds of formula (I) above may be produced by the process which comprises reacting a thiophosphoric acid salt of the formula

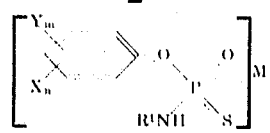

in which
$R^1$, X, Y, $n$ and $m$ are the same as defined above, and
M is a metal atom, e.g. alkali metal such as sodium, potassium, and the like, especially potassium, or an ammonium radical,
with a halide compound of the formula $$R^2.Hal \qquad (III)$$

in which
$R^2$ is the same as defined above, and
Hal is a halo atom such as chloro, bromo, iodo and fluoro, especially chloro.

Surprisingly, the particular new compounds of formula I above according to the present invention show both higher and more specific fungicidal, acaricidal, insecticidal and nematocidal effectiveness than the previously known compounds which are known to be usable for such purposes, e.g. compounds (A), (B), (C), (D) and (E) above. The instant compounds are especially effective as fungicides in the control of blast, leaf spot and sheath blight of rice plants, as insecticides and acaricides for insect and mite pests, and as nematocides, with little or no phytotoxic effect toward cultivated plants such as rice. The instant compounds therefore represent a valuable contribution to the art.

The thiophosphoric acid salt of formula II above may itself be prepared by reacting an O-phenyl-N-alkyl-amido-thionophosphoric acid chloride of the formula

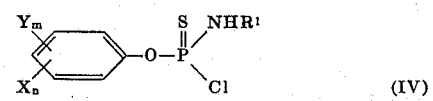

in which
$R_1$, X, Y, $n$ and $m$ are the same as defined above, and with an alkali or base of the formula $$M—OH \qquad (V)$$

in which
M is the same as defined above.

The compounds of formula I above may therefore be prepared (precursor reaction) by reacting an acid chloride of formula IV above with an alkali or base of formula V above, and reacting the thiophosphoric acid salt of formula II above thus obtained with a halide compound of formula III above, to produce the corresponding organophosphoric acid ester of formula I above according to the present invention.

The following formulae schemes illustrate the overall reaction course leading to the production of the instant compounds:

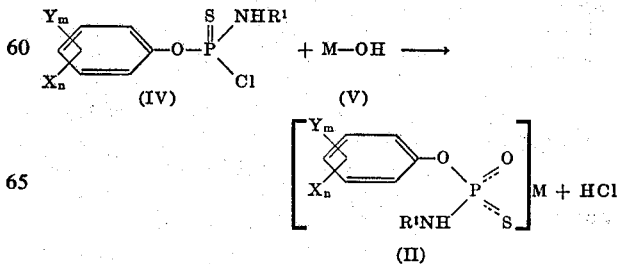

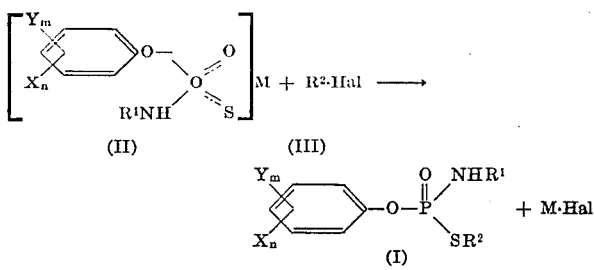

(II)  (III)

$$\underset{X_n}{\overset{Y_m}{\diagdown}}\!\!\!\!\!\bigcirc\!\!-O-\overset{O}{\underset{SR^2}{\overset{\|}{P}}}\!\!\diagdown\!\!NHR^1 + M\cdot Hal$$

(I)

in which

R¹, R², X, Y, n, m, Hal and M are the same as defined above.

Advantageously, in accordance with the present invention, in the various formulae herein:

R¹ represents
straight and branched chain lower alkyl hydrocarbon of one to six carbon atoms such as methyl, ethyl, n- and iso-propyl, n-, iso-, sec.- and tert.-butyl, n- and iso-amyl, n- and iso-hexyl, and the like, especially $C_{1-5}$ or $C_{1-4}$ or $C_{1-3}$ or $C_{1-2}$ alkyl, or
cycloalkyl hydrocarbon of five to six ring carbon atoms such as cyclopentyl, cyclohexyl, and the like, especially cyclohexyl;

R² represents
straight and branched chain lower alkyl kydrocarbon of one to six carbon atoms such as methyl to iso-hexyl inclusive as defined above, and the like, especially $C_{1-5}$ or $C_{1-4}$ or $C_{1-3}$ or $C_{1-2}$ alkyl,
straight and branched chain lower alkenyl hydrocarbon of two to six carbon atoms such as vinyl, 1-methyl-vinyl, 1- and 2-propenyl, 1-(2- and 3-)butyl, 1-and 2-methyl-1-and 2-propenyl, 1-(2-,3-and 4-) pentenyl, 1-(2-and 3-) methyl-1-(2-and 3-) butyl, 1-(2-,3-,4-and 5-) hexenyl, 1-(2-,3-and 4-)methyl-1-(2-,3-and 4-) pentenyl, and the like, especially $C_{2-5}$ or $C_{2-4}$ or $C_{2-3}$ or $C_{3-6}$ or $C_{3-5}$ or $C_{3-4}$alkenyl, and more especially allyl,
straight and branched chain lower alkynyl hydrocarbon of two to six carbon atoms such as acetylenyl, 1-and 2-propynyl, 1-(2-and 3-)butynyl, 1-methyl-2-propynyl, 1-(2-,3- and 4-) pentynyl, 2-and 3-methyl-1-butynyl, 1-and 4-methyl-2-butynyl, 1-and 2-methyl-3-butynyl, 1-(2-, 3-, 4-and 5-)hexynyl, and the like, especially $C_{2-5}$ or $C_{2-4}$ or $C_{2-3}$ or $C_{3-5}$ or $C_{3-4}$ alkynyl, and especially propynyl,
chloro-substituted straight and branched chain lower alkyl of one to six carbon atoms such as chloro-methyl to isohexyl inclusive as defined above, and the like, especially chloro-$C_{1-5}$ or $C_{1-4}$ or $C_{1-3}$ or $C_{1-2}$ alkyl, and more especially ω-chloro-$C_{2-3}$ alkyl, or
phenyl-alkyl having one to two carbon atoms in the alkyl moiety such as benzyl, phenethyl,α-methylbenzyl, and the like, especially benzyl and phenethyl;

X represents
hydrogen, and/or
halo such as chloro, bromo, iodo and/or fluoro, especially chloro and/or bromo;

Y represents
hydrogen,
straight and branched chain lower alkyl hydrocarbon of one to four carbon atoms such as methyl to tert.-butyl inclusive as defined above, and the like, especially $C_{1-3}$ or $C_{1-2}$ alkyl, and/or straight and branched chain lower alkoxy such as methoxy, ethoxy, n- and iso- propoxy, n-, iso-, sec.- and tert.-butoxy, and the like, especially $C_{1-3}$ or $C_{1-2}$ alkoxy;

n represents
a whole number from 1 to 3, i.e. 1,2 or 3; and m represents
a whole number from 1 to 2, i.e. 1 or 2;
such that $X_n$, when X is halo, is 2-, 3- and 4-mono, 2,3-, 2,4-, 2,5, 2,6-, 3,4- and 3,5-di, and 2,3,4-, 2,3,5- 2,3,6-, 2,4,5-, 2,4,6- and 3,4,5-tri (same and mixed) chloro, bromo, iodo and/or fluoro, especially chloro, and Ym, when Y is alkyl or alkoxy, is correspondingly 2-, 3-, 4-, 5- and 6-mono and 2,3-, 2,4-, 2,5-, 2,6-, 3,4- and 3,5- di (same and mixed) methyl to tert.-butyl inclusive as defined above and/or methoxy to tert.-butoxy inclusive as defined above.

Preferably, R¹ is $C_{1-5}$ or $C_{1-4}$ or $C_{1-3}$ or $C_{1-2}$ alkyl; or cyclohexyl; R² is $C_{1-5}$ or $C_{1-4}$ or $C_{1-3}$ or $C_{1-2}$ alkyl; or $C_{2-5}$ or $C_{2-4}$ or $C_{2-3}$ or $C_{3-6}$ or $C_{3-5}$ or $C_{3-4}$ alkenyl; or $C_{2-5}$ or $C_{2-4}$ or $C_{2-3}$ or $C_{3-6}$ or $C_{3-5}$ or $C_{3-4}$ alkynyl; or chloro-$C_{1-5}$ or $C_{1-4}$ or $C_{1-3}$ or $C_{1-2}$ alkyl; or benzyl phenethyl;X is hydrogen; or chloro; or bromo; Y is hydrogen; or $C_{1-3}$ or $C_{1-2}$ alkyl; or $C_{1-3}$ or $C_{1-2}$ alkoxy; n is 1–3; and m is 1–2.

In particular, R¹ is $C_{1-4}$ alkyl; or cyclohexyl; R² is $C_{1-4}$ alkyl; or $C_{3-4}$ alkenyl; or $C_{3-4}$ alkynyl; or chloro-$C_{1-4}$ alkyl; or benzyl; or phenethyl ; X is hydrogen; or chloro; or bromo; Y is hydrogen; or $C_{1-2}$ alkyl; or $C_{1-2}$ alkoxy; n is 1–3; and m is 1–2.

The starting materials which may be used for the instant reaction and the stated precursor reaction are clearly characterized by formulae II, III, IV and V noted above.

As examples of thiophosphoric acid salts of formula II above which may be used as starting materials (e.g. prepared by the stated precursor reaction), there are mentioned:

O-[(optionally 2-,3-,4-,5- and/or 6-mono to tri chloro or bromo and/or mono to di methyl, ethyl, n- and iso-propyl, n-, iso-, sec.- and tert.-butyl, or methoxy, ethoxy, n- and iso-propoxy, n-, iso-, sec.- and tert.-butoxy)-phenyl]- N-(methyl, ethyl, n- and iso-propyl, n-, iso-, sec.- and tert.-butyl, n- and iso-amyl, n-and iso-hexyl, cyclopentyl and cyclohexyl)-amido-thionophosphoric acid potassium, sodium and ammonium salts, and the like.

As examples of halide compounds of formula III above which may be used as starting materials, there are mentioned:
methyl, ethyl, n- and iso-propyl, n-, iso, sec.- and tert.-butyl, vinyl, allyl, 2-propynyl, 2-chloroethyl, 3-chloropropyl, and benzyl, and phenethyl,-chlorides, bromides, iodides and fluorides, and the like.

The process is preferably carried out in the presence of water and/or an inert organic solvent (this term includes a mere diluent). Examples of such solvents include aliphatic or aromatic hydrocarbons (which may be halogenated), for example benzine, methylene chloride, chloroform, carbon tetrachloride, benzene, chlorobenzene, toluene, and xylene; ethers, for example diethyl ether, dibutyl ether, dioxan, and tetrahydrofuran; aliphatic alcohols or ketones which have low boiling points, for example methanol, ethanol, isopropyl ketone, methyl ethyl ketone and methyl isobutyl ketone; and the like. Lower aliphatic nitriles, for example acetonitrile, propionitrile, and the like, may also be used.

The production reaction according to the present invention may be carried out within a fairly wide temperature range, but in general at temperatures from substantially between about 0–100°C, preferably between about 30–80°C.

In carrying out the production process, one may for example proceed as follows 1 mol of the thiophosphoric acid salt of formula II above is dissolved in one of the above-noted solvents, preferably methyl or ethyl alcohol or dioxane, and to this solution is added dropwise 1 mol of the halide compound of formula III above at about 30–50°C, and the mixture is stirred for about 3 hours at about 60–70°C. Then the mixture is cooled and filtered to remove alkali(metal)halide precipitate, and the solvent removed by distillation. If desired, the residue can be purified by redissolving in benzene, washing with sodium carbonate solution, drying over anhydrous sodium sulfate, distilling off the benzene, and finally recrystallizing from n-hexane/benzene or distilling under reduced pressure.

The compounds of the present invention are generally colorless or light yellow chemical substances which are difficulty soluble in water, yet soluble in organic solvents, such as alcohol, ketone, benzene, etc.

Advantageously, the instant active compounds can be applied as insecticides against a broad spectrum of insect pests. Such compounds show remarkably good insecticidal activity against various insect pests including rice insect pests, such as rice plant-hoppers and leaf-hoppers as well as other insect pests of the Coleoptera and Diptera orders.

The instant active compounds are also very effective against nematodes which are parasitic on plants.

An especially significant property of such active compounds is their remarkable effect against mites, especially spider mites resistant to organophosphorous compounds, and their insecticidal effect against larvae of the Lepidoptera order such as almond moths and rice stem borers is several times stronger than the hertofore generally used analogous known compounds.

Moreover, the instant compounds have a controlling effect on plant diseases caused by a broad spectrum of fungi such as Archimycetes, Phycomycetes, Ascomycetes, Basidiomycetes, *Fungi imperfecti*, etc. In particular, such active compounds produce excellent fungicidal effects against blast, Helminthosporium leaf spot and sheath blight of rice plants, as well as against mildew of fruit trees and vegetables.

The active compounds according to the present invention thus possesses a pronounced biological effect, i.e. biocidal or pesticidal effect, against a wide range of pests, having both insecticidal and fungicidal activities, and, therefore, such compounds are of great practical value. Furthermore, since the instant compounds do not contain heavy metals such as mercury, the chronic mammalian toxicity of which is becoming a health hazard, there is no problem of residual toxicity of crops. The instant active compounds, of course, are also easily handled without danger.

Thus, the present compounds are effective fungicides, acaricides and insecticides, e.g. when applied to plants, especially against blast, leaf spot and sheath blight, as well as against resistant spider mites, substantially without phytotoxicity to the plants. It is also possible to control rice white-tip nematodes with the instant active compounds, e.g. by treating seed contaminated therewith.

The active compounds according to the instant invention can be utilized, if desired, in the form of the usual formulations or compositions wtih conventional inert (i.e. plant compatible or herbicidally inert) pesticide diluents or extenders, i.e. diluents or extenders of the type usable in conventional pesticide formulations or compositions, e.g. conventional pesticide dispersible carrier vehicles, such as solutions, emulsions, suspensions, emulsifiable concentrates, spray powders, pastes, soluble powders, dusting agents, granules, etc. These are prepared in known manner, for instance by extending the active compounds with conventional pesticide dispersible liquid diluent carriers and/or dispersible solid carriers optionally with the use of carrier vehicle assistants, e.g. conventional pesticide surface-active agents, including emulsifying agents and/or dispersing agents, whereby, for example, in the case where water is used as diluent, organic solvents may be added as auxiliary solvents. The following may be chiefly considered for use as conventional carrier vehicles for this purpose: inert dispersible liquid diluent carriers including inert organic solvents, such as aromatic hydrocarbons (e.g. benzene, toluene, xylene, etc.), halogenated, especially chlorinated, aromatic hydrocarbons (e.g. chlorobenzenes), paraffins (e.g. petroleum fractions), chlorinated aliphatic hydrocarbons (e.g. methylene chloride, etc.), alcohols (e.g. methanol, ethanol, propanol, butanol, etc.), ethers, ether-alcohols (e.g. glycol monomethyl ether, etc.), amines (e.g. ethanol-amine, etc.), amides (e.g. dimethyl formamide, etc.), sulfoxides (e.g. dimethyl sulfoxide, etc.), ketones (e.g. acetone, etc.), and/or water; as well as inert dispersible finely divided solid carriers, such as ground natural minerals (e.g. kaolins, alumina, silica, chalk, i.e. calcium carbonate, talc, kieselguhr, montmorillonite, clay, etc.), and ground synthetic minerals (e.g. highly dispersed silicic acid, silicates, e.g. alkali silicates, etc.); whereas the following may be chiefly considered for use as conventional carrier vehicle assistants, e.g. surface-active agents, for this purpose: emulsifying agents, such as non-ionic and/or anionic emulsifying agents (e.g. polyethylene oxide esters of fatty acids, polyethylene oxide ethers of fatty alcohols, alkyl sulfonates, aryl sulfonates, etc., and especially alkyl aryl-polyglycol ethers, magnesium stearate, sodium oleate, etc.); and/or dispersing agents, such as lignin, sulfite waste liquors, methyl cellulose, etc.

As will be appreciated by the artisan, the active compounds according to the instant invention may be employed alone or in the form of mixtures with one another and/or with such solid and/or liquid dispersible carrier vehicles and/or with other known compatible active agents, especially plant protection agents, such as other fungicides, insecticides, acaricides and nematocides, or herbicides, bactericides, plant growth regulators, soil disinfectants, including organo-phosphorus compounds, organic sulfur compounds, phenoxy compounds, chlorophenol compounds, carbamates, dithiocarbamates, diphenyl ethers, urea compounds, anilide compounds, dinitro compounds, triazine compounds, antibiotics, and other known agricultural chemicals and/or fertilizers, etc., if desired, or in the form of particular dosage preparations for specific application made therefrom, such as solutions, emulsions, suspensions, powders, pastes, and granules which are thus ready for use.

As concerns commercially marketed preparations, these generally contemplate carrier composition mixtures in which the active compound is present in an amount substantially between about 0.1 and 95 percent by weight, and preferably 0.5 and 90 percent by weight, of the mixture, whereas carrier composition mixtures suitable for direct application or field application generally contemplate those in which the active compound is present in an amount substantially between about 0.001–10 percent, preferably 0.005–5 percent, by weight of the mixture. Thus, the present invention contemplates over-all compositions which comprise mixtures of a conventional dispersible carrier vehicle such as (1) a dispersible inert finely divided carrier solid, and/or (2) a dispersible carrier liquid such as an inert organic solvent and/or water preferably including a surface-active effective amount of a carrier vehicle assistant, e.g. a surface-active agent, such as an emulsifying agent and/or a dispersing agent, and an amount of the active compound which is effective for the purpose in question and which is generally between about 0.001–95 percent, and preferably 0.005–95 percent, by weight of the mixture.

In particular, the amount of active compound applied per unit area varies according to the purpose intended, i.e. the effect desired, and the mode of application. In general, quantities of substantially between about 3–1,000 g., preferably 30–500 g, of active compound per 10 ares, are applied, i.e. irrespective of the presence or absence of the carrier vehicle.

The active compounds can also be used in accordance with the well-known ultra-low-volume process with good success, i.e. by applying such compound if normally a liquid, or by applying a liquid composition containing the same, via very effective atomizing equipment, in finely divided form, e.g. average particle diameter of from 50–100 microns, or even less, i.e. mist form, for example by airplane crop spraying techniques. Only up to at most about a few liters/hectare are needed, and often amounts only up to about 1 quart/acre, preferably 2–16 fluid ounces/acre, are sufficient. In this process it is possible to use highly concentrated liquid compositions with said liquid carrier vehicles containing from about 20 to about 95 percent by weight of the active compound or even the 100 percent active substance alone, e.g. about 20–100 percent by weight of the active compound.

Furthermore, the present invention contemplates methods of selectively killing, combatting or controlling pests, and more particularly fungi, arthropods, e.g. insects and acarids, as well as nematodes, and the like, which comprise applying to such pests, i.e. at least one of correspondingly (a) such fungi, (b) such arthropods, (c) such nematodes and (d) the corresponding habitat thereof, i.e. the locus to be protected, a pesticidally, i.e. a corresponding fungicidally, arthropodicidally, i.e. insecticidally and acaricidally, or nematocidally, effective or toxic amount of the particular compound of the invention alone or together with a carrier vehicle as noted above. The instant formulations or compositions are applied in the usual manner, for example by spraying, atomizing, scattering, dusting, watering, sprinkling, seed dressing, and the like.

More specifically, the compositions of the present invention can be applied by any conventional method, for example dusting directly onto the foilage of plants, seed-dressing, diluting an emulsifiable concentrate with water or other diluent to a desirable concentration and spraying onto the stems and leaves of plants, suspending a wettable powder in water at a desirable concentration and spraying onto the stems and leaves of plants, or applying granules directly to soil.

It will be realized, of course, that in connection with the fungicidal, insecticidal, acaricidal and nematocidal use of the instant compounds, the concentration of the particular active compound utilized in admixture with the carrier vehicle will depend upon the intended application and may be varied within a fairly wide range depending upon the weather conditions, the soil, the purpose for which the active compound is used, e.g. for fungicidal, arthropodicidal or nematocidal effect, and the plants which are to be protected. Therefore, in special cases, it is possible to go above or below the aforementioned concentration ranges and amounts per unit area.

The following illustrate, without limitation, examples of formulations which may be used in accordance with the present invention Formulation A 15 parts by weight of compound (56), 80 parts by weight of a mixture of diatomaceous earth and kaolin 1:5, and 5 parts by weight of Runnox (trade name of the product of Toho Kagaku Kogyo K.K., Japan: polyoxyethylene alkylaryl ether) are crushed and mixed to form a wettable powder. The powder is diluted with water to a concentration of 0.05 – 0.001 percent when applied, for instance, as an acaricide.

Formulation B 30 parts by weight of compound (108), 30 parts by weight of xylene, 30 parts by weight of Kawakazol (trade name of the product of Kawasaki Kasei Kogyo K.K., Japan: aromatic hydrocarbons of higher boiling point), and 10 parts by weight of the emulsifier Sorpol (trade name of the product of Toho Kagaku Kogyo K.K., Japan: polyoxyethylene alkylaryl ether) are mixed and stirred to form an emulsifiable concentrate. The concentrate is diluted with water to a concentration of 0.005 – 0.1 percent when applied, for instance, as an insecticide or fungicide.

Formulation C 25 parts by weight of water are added to a mixture comprising 5 parts by weight of compound (131), 10 parts by weight of bentonite, 83 parts by weight of clay and 2 parts by weight of lignin sulfonate, and the mixture is firmly kneaded. The kneaded mixture is formed into granules of 20 – 40 mesh by a push-out type mulmerizer. The granules are then dried at a temperature of 40° – 50°C. Such granules are applied, for instance, by scattering on the surface of soil or water of paddy fields in an amount of 2 – 6 kg per 10 ares.

Formulation D 2 parts by weight of compound (54) and 98 parts by weight of 3:1 mixture of talc and clay are crushed and mixed to give a dust formulation. The formulation is applied directly onto the plants or soil.

Formulation E 3 parts by weight of compound (109) and 10 parts by weight of methylnaphthalene are dissolved in 7 parts by weight of dimethylformamide. The resulting solution is further dissolved in 80 parts by weight of freon to form a homogeneous solution, which is then processed to provide an aerosol. Such areosol is applied by spraying.

Formulation F 1.5 parts by weight of compound (80) are dissolved in 20 parts by weight of Velcicol (tradename of an aromatic hdyrocarbon solvent product of Velcicol Chemical Corp.). The resulting solution is mixed with 78.5 parts by weight of Kerosene to form an oil formulation. Such formulation is applied in an amount of 60 ml per square meter to places such as dumping grounds where flies gather.

The fungicidal, acaricidal, insecticidal and nematocidal effectiveness of the active compounds according to the present invention are illustrated, without limitation, by the following examples.

Example 1 a. Test against rice blast (Pot test)

A diluted liquid prepared as described in Formulation (B) above, using the particular active compounds identified in the first column of Table 1 below, respectively, at a concentration of 500 parts per million, is sprayed at the tillering stage onto paddy rice plants (Jukkoku variety) in pots of 12 cm diameter.

Spraying is carried out by placing the pots on a turntable which is revolved while the liquid is sprayed onto the plants from the nozzle of a spray-gun. Spraying is effected at a nozzle pressure of 1.5 kg/cm$^2$ to provide 50 ml of spray liquid per 4 pots, such that the leaves of the rice plants become dripping wet.

On the next day, the sprayed rice plants are placed in a moisture chamber which is kept at 100 percent relative humidity and at 25°C. for 48 hours. During this time, a spore suspension of rice blast from a culture is twice sprayed onto the plants for inoculation purposes.

7 days after the inoculation, the degree of disease per pot is evaluated and characterized according to a scale from 0 to 5 as follows:

| Disease rate | Percentage of disease-spot area |
|---|---|
| 0 | |
| 0 % | |
| 0.5 | 2 % |
| 1 | 3–5% |
| 2 | 6–10% |
| 3 | 11–20% |
| 4 | 21–40% |
| 5 | 41% or more |

The results obtained are given in the second column of Table 1 below which shows the mean values of 4 pots.

b. Test against sheath blight (Pot test)

Paddy rice (Kinmaze variety) is cultivated in unglazed pots of 12 cm diameter. A diluted liquid, prepared as described in Formulation (A) above using the particular active compounds identified in Table 1 below, respectively, at a concentration of 500 parts per million is sprayed onto the plants at the beginning of the tillering stage.

On the next day, the sheath blight pathogen forming screlotia, which had been cultured on barley medium for 10 days, is inoculated at the bottom of the stem of the sprayed paddy rice plants. The plants are then placed in an inoculation chamber and kept there at a relative humidity of more than 95 percent and at a temperature of 28 to 30°C for 8 days to develop the disease.

An evaluation is made of the development of diseased spots from the inoculated bottoms of the stems of the rice plants according to the following standard, and the degree of damage is calculated according to the formula:

$$\text{Degree of damage} = (3n_3 - 2n_2 - n_1 - 0n_o)/3N \times 100$$

in which

N : Number of all treated stems.

$n_o$ : Number of stems on which no disease development is seen.

$n_1$ : Number of stems on which disease development is seen from the inoculated bottom of the stems to the first leaf-sheath.

$n_2$ : Number of stems on which disease development is seen from the inoculated bottom of the stems to the second leaf-sheath.

$n_3$ : Number of stems on which disease development is seen from the inoculated bottom of the stems to the third or upper leaf-sheath.

The results obtained are given in the third column of Table 1 below which shows the mean values of 3 pots.

TABLE 1

Test results of effectiveness against blast and sheath blight of rice

| Compound No. (see Table 6) | a. Degree of blast disease | b. Degree of sheath blight damage |
|---|---|---|
| $(1_1)$ | | 10.3 |
| $(2_1)$ | | 18.4 |
| $(3_1)$ | | 14.0 |
| $(4_1)$ | | 16.6 |
| $(5_1)$ | 1.8 | 19.3 |
| $(6_1)$ | 1.6 | 20.0 |
| $(7_1)$ | 1.5 | |
| $(12_1)$ | 0.8 | 18.2 |
| $(13_1)$ | 0.5 | 20.3 |
| $(14_1)$ | 0.4 | |
| $(15_1)$ | 1.0 | |
| $(16_1)$ | | 10.6 |
| $(17_1)$ | | 15.4 |
| $(18_1)$ | 2.0 | |
| $(19_1)$ | 1.2 | 12.7 |
| $(20_1)$ | 1.8 | 13.5 |
| $(21_1)$ | 1.6 | 11.5 |
| $(22_1)$ | | 14.3 |
| $(23_1)$ | | 20.7 |
| $(24_1)$ | 2.0 | |
| $(25_1)$ | 0.5 | |
| $(26_1)$ | 1.0 | |
| $(28_1)$ | 0.6 | 13.6 |
| $(29_1)$ | 1.6 | 19.4 |
| $(32_1)$ | 2.0 | 19.8 |
| $(33_1)$ | | 15.6 |
| $(34_1)$ | 2.0 | 11.5 |
| $(35_1)$ | | 18.2 |
| $(36_1)$ | 1.8 | 9.8 |
| $(37_1)$ | 1.5 | 16.1 |
| $(38_1)$ | 0.8 | |
| $(39_1)$ | 2.0 | |
| $(40_1)$ | 1.8 | |
| $(41_1)$ | 0.9 | 12.5 |
| $(42_1)$ | 1.5 | 25.3 |
| $(43_1)$ | 1.8 | |
| $(44_1)$ | 1.0 | |
| $(45_1)$ | 0.8 | 8.3 |
| $(46_1)$ | 1.3 | 14.4 |
| $(47_1)$ | 1.0 | 15.0 |
| $(48_1)$ | 1.0 | 14.3 |
| $(49_1)$ | 0.8 | |
| $(51_1)$ | 1.8 | 10.4 |
| $(52_1)$ | 2.0 | 20.0 |
| $(53_1)$ | | 12.7 |
| $(54_1)$ | 1.5 | 8.0 |
| $(55_1)$ | | 16.6 |
| $(56_1)$ | 0.5 | 13.2 |
| $(57_1)$ | 2.0 | 15.8 |
| $(63_1)$ | 1.0 | 20.3 |
| $(64_1)$ | 1.2 | |
| $(65_1)$ | 1.1 | |
| $(66_1)$ | 2.2 | |
| $(67_1)$ | 1.5 | |
| $(68_1)$ | 0.8 | 12.3 |
| $(69_1)$ | 0.3 | 14.0 |

| Compound | Col2 | Col3 |
|---|---|---|
| (73₁) | | 7.4 |
| (74₁) | | 11.6 |
| (75₁) | 1.8 | |
| (76₁) | 2.2 | |
| (77₁) | 1.8 | |
| (78₁) | 1.0 | |
| (79₁) | 1.2 | |
| (80₁) | 1.6 | |
| (81₁) | 1.8 | |
| (82₁) | 2.0 | |
| (83₁) | 1.0 | |
| (84₁) | 0.5 | |
| (85₁) | 1.2 | |
| (87₁) | 1.2 | |
| (88₁) | 1.0 | 18.5 |
| (89₁) | 1.8 | 9.3 |
| (90₁) | 2.0 | 8.4 |
| (91₁) | 0.8 | 10.3 |
| (92₁) | 1.3 | 14.6 |
| (97₁) | 1.5 | 18.4 |
| (98₁) | 1.0 | |
| (99₁) | 1.2 | |
| (100₁) | 2.0 | |
| (101₁) | 2.2 | |
| (102₁) | 1.0 | 13.2 |
| (103₁) | 1.2 | |
| (106₁) | | 18.0 |
| (107₁) | | 16.3 |
| (108₁) | 2.0 | |
| (109₁) | 1.3 | |
| (118₁) | 2.0 | |
| (119₁) | 1.8 | |
| (120₁) | 1.6 | |
| (121₁) | 1.5 | |
| (122₁) | | 12.6 |
| (123₁) | | 14.3 |
| (124₁) | | 11.5 |
| (125₁) | 2.0 | |
| (126₁) | 1.8 | |
| (127₁) | 1.6 | |
| (128₁) | 1.2 | |
| (129₁) | | 14.0 |
| (130₁) | | 10.4 |
| (131₁) | | 15.2 |
| (132₁) | 2.0 | 20.3 |
| (136₁) | | 11.7 |
| (143₁) | 0.5 | |
| (144₁) | 1.0 | |
| (145₁) | 1.2 | |
| (146₁) | 1.2 | |
| (147₁) | 1.0 | 12.8 |
| (148₁) | 0.5 | |
| (149₁) | 1.5 | 10.6 |
| (151₁) | 0.5 | |
| (152₁) | 1.0 | |
| (153₁) | 1.2 | |
| (154₁) | 1.0 | |
| (155₁) | 2.0 | |
| (156₁) | 0.5 | 16.7 |
| (157₁) | 0.5 | 15.3 |
| (158₁) | 1.2 | |
| (159₁) | 0.8 | |
| (160₁) | 1.0 | 16.5 |
| (161₁) | 1.2 | |
| (162₁) | 1.5 | |
| (163₁) | 1.5 | |
| (164₁) | 1.8 | |
| (165₁) | | 14.0 |
| (170₁) | 1.5 | 20.0 |
| (171₁) | 2.0 | |
| (172₁) | 1.6 | 18.5 |
| (177₁) | 1.2 | 14.5 |
| (178₁) | 1.5 | |
| (179₁) | 1.6 | 15.4 |
| (185₁) | 2.0 | |
| (186₁) | 1.8 | |
| (192₁) | | 8.3 |
| (193₁) | | 12.4 |
| (194₁) | | 13.1 |
| 196₁ | | 7.8 |
| (202₁) | 2.0 | 19.3 |
| (204₁) | 1.5 | 16.8 |
| (205₁) | 1.0 | 18.2 |
| (207₁) | 1.5 | 18.6 |
| (208₁) | 2.0 | 16.4 |
| (209₁) | 2.0 | 18.9 |
| (210₁) | 2.0 | |
| (211₁) | 2.0 | 19.0 |
| (212₁) | 2.0 | |
| (213₁) | 2.0 | |
| (214₁) | 2.0 | |
| (215₁) | 2.2 | |
| (216₁) | 2.0 | |
| (217₁) | 2.0 | |
| (218₁) | 2.0 | 20.0 |
| (220₁) | 2.2 | |
| (221₁) | 1.5 | 17.0 |
| (224₁) | 1.6 | 16.5 |
| (227₁) | 2.0 | 18.0 |
| (228₁) | 2.0 | |
| (229₁) | 1.8 | 19.0 |
| (230₁) | 1.8 | 20.0 |
| (231₁) | 1.5 | 18.1 |
| (234₁) | 1.6 | 17.8 |
| (237₁) | 2.0 | |
| (238₁) | 2.0 | |
| (239₁) | 2.2 | |
| (240₁) | 2.2 | |
| (243₁) | 1.6 | 17.2 |
| (248₁) | 2.0 | 18.3 |
| (249₁) | 2.0 | |
| (250₁) | 2.0 | |
| (251₁) | 1.5 | |
| (252₁) | 1.0 | 18.0 |
| (253₁) | 1.0 | |
| (254₁) | 2.0 | |
| (255₁) | 2.0 | |
| (256₁) | 1.5 | |
| (257₁) | 2.2 | |
| (258₁) | 2.2 | |
| (259₁) | 2.0 | |
| (260₁) | 2.2 | |
| (261₁) | 2.2 | |
| (262₁) | 2.2 | |
| (263₁) | 2.0 | 18.5 |
| (272₁) | 2.2 | |
| 273₁) | 1.5 | |
| (274₁) | 2.0 | |
| 0,0-diisopropyl-S-benzyl-phosphoro-(A)thiolate (Commercial product comparison) | 2.2 | 20.0 |
| Non-treatment (Control) | 5.0 | 48.3 |

Example 2

Test against powdery mildew of cucumber (Pot test)

Cucumbers (Shimoshirazu variety) are grown in unglazed pots of 15 cm diameter to the 3 – 4 leaf stage. A diluted solution of the particular active compounds identified in Table 2 below, respectively, at the concentrations shown in the second column of such table, is sprayed at a rate of 50 ml per 3 pots in the manner described in Example 1 above.

After spraying, the pots are placed in a greenhouse and one day later the conidia of powdery mildew (*Sphaerotheca fuliginea*), collected from naturally infected cucumber seedlings, is inoculated onto the leaves of the sprayed seedlings by uniform sprinkling.

8 days after inoculation, the degree of disease development per leaf is classified from $n_0 - n_4$ according to the following standard:

| Degree of damage | % od diseased spot area |
|---|---|
| $n_0$ | 0 % |
| $n_1$ | 10 % |
| $n_2$ | 11–30 % |
| $n_3$ | 31–70 % |
| $n_4$ | 70 % |

The degree of damage per pot is calculated according to the following formula:

Degree of damage per pot = $(4n_4 + 3n_3 + 2n_2 + n_1 + 0n_0)/4N \times 100$ in which
N is the number of investigated leaves.

The results obtained are given in Table 2 below which shows the mean value of the degree of damage of 3 pots.

TABLE 2

Results of effective test against powdery mildew of cucumber

| Compound No. (see Table 6) | Concentration of active compound (ppm) | Degree of Damage |
|---|---|---|
| ($3_2$) | 500 | 30 |
| ($4_2$) | 500 | 35 |
| ($5_2$) | 500 | 7 |
| ($6_2$) | 500 | 40 |
| ($56_2$) | 500 | 32 |
| ($57_2$) | 500 | 9 |
| ($91_2$) | 500 | 30 |
| ($92_2$) | 500 | 6 |
| ($109_2$) | 500 | 7 |
| (B) Udonkol (Commercial product - comparison) | 250 | 32 |
| Non-treatment (control) | — | 100 |

Note: (B) Udonkol: N-(β-cyano-ethyl)-monochloroacetamide

Example 3

Controlling effect test against carmine mite 50 to 100 mature and young carmine mites, which are organophosphorous acaricide-resistant, are provided by successive breeding. Such mites are placed on the leaves of kidney bean bushes planted in a vinyl pot of 6 cm diameter. 2 days later, a diluted solution of the prescribed concentration of the particular active compounds indicated in Table 3 below, respectively, is sprayed thereon in the manner described in Example 1 above. The so-treated pots are then placed in a greenhouse. 10 days later, the controlling effect is evaluated according to the following scale:

3: The proportion of surviving adult and young mites as well as eggs is 0 percent compared with that of the non-treated group (control).

2: The proportion of surviving adult and young mites as well as eggs is less than 5 percent compared with that of the non-treated group.

1: The proportion of surviving adult and young mites as well as eggs is 5 – 50 percent compared with that of the non-treated group.

0: The proportion of surviving adult and young mites as well as eggs is more than 50 percent compared with that of the non-treated group.

The results obtained are given in Table 3 below.

TABLE 3

| Compound No. (see Table 6) | Controlling effect of active compound at concentration of | |
|---|---|---|
| | 0.05% | 0.025% |
| ($3_3$) | 3 | 3 |
| ($4_3$) | 3 | 1 |
| ($5_3$) | 3 | 3 |
| ($6_3$) | 3 | 2 |
| ($7_2$) | 3 | 2 |
| ($8_1$) | 3 | 3 |
| ($9_1$) | 3 | 2 |
| ($10_1$) | 3 | 2 |
| ($11_1$) | 3 | 2 |
| ($12_2$) | 3 | 2 |
| ($13_2$) | 3 | 3 |
| ($14_2$) | 3 | 2 |
| ($15_2$) | 3 | 2 |
| ($16_2$) | 3 | 1 |
| ($17_2$) | 3 | 1 |
| ($20_2$) | 3 | 3 |
| ($21_2$) | 3 | 2 |
| ($24_2$) | 3 | 3 |
| ($25_2$) | 3 | 1 |
| ($26_2$) | 3 | 3 |
| ($27_1$) | 3 | 2 |
| ($28_2$) | 3 | 3 |
| ($30_1$) | 3 | 3 |
| ($31_1$) | 2 | 1 |
| ($32_2$) | 3 | 1 |
| ($34_2$) | 3 | 2 |
| ($38_2$) | 3 | 2 |
| ($41_2$) | 3 | 2 |
| ($42_2$) | 3 | 2 |
| ($45_2$) | 3 | 1 |
| ($46_2$) | 3 | 3 |
| ($49_2$) | 3 | 2 |
| ($50_1$) | 3 | 1 |
| ($56_3$) | 3 | 3 |
| ($57_3$) | 3 | 3 |
| ($58_1$) | 3 | 2 |
| ($59_1$) | 3 | 3 |
| ($60_1$) | 3 | 3 |
| ($61_1$) | 3 | 2 |
| ($62_1$) | 3 | 1 |
| ($63_2$) | 3 | 3 |
| ($64_2$) | 3 | 3 |
| ($65_2$) | 3 | 3 |
| ($68_2$) | 3 | 3 |
| ($69_2$) | 3 | 3 |
| ($70_1$) | 3 | 2 |
| ($71_1$) | 3 | 2 |
| ($72_1$) | 2 | 2 |
| ($73_2$) | 3 | 1 |
| ($74_2$) | 3 | 1 |
| ($75_2$) | 3 | 2 |
| ($78_2$) | 3 | 3 |
| ($79_2$) | 3 | 3 |
| ($80_2$) | 3 | 3 |
| ($81_2$) | 3 | 3 |
| ($83_2$) | 3 | 1 |
| ($84_2$) | 3 | 3 |
| ($85_2$) | 3 | 3 |
| ($86_1$) | 3 | 2 |
| ($87_2$) | 3 | 2 |
| ($88_2$) | 3 | 2 |
| ($90_2$) | 3 | 2 |
| ($91_3$) | 3 | 3 |
| ($92_3$) | 3 | 3 |
| ($93_1$) | 3 | 3 |
| ($94_1$) | 3 | 2 |
| ($95_1$) | 3 | 2 |
| ($96_1$) | 3 | 2 |
| ($97_2$) | 3 | 2 |
| ($98_2$) | 3 | 3 |
| ($99_2$) | 3 | 3 |
| ($102_2$) | 3 | 3 |
| ($103_2$) | 3 | 3 |
| ($104_1$) | 3 | 2 |
| ($105_1$) | 3 | 1 |
| ($108_2$) | 3 | 3 |
| ($109_3$) | 3 | 3 |
| ($110_1$) | 3 | 1 |
| ($114_1$) | 3 | 2 |
| ($115_1$) | 3 | 3 |
| ($125_2$) | 3 | 3 |
| ($126_2$) | 3 | 3 |
| ($130_2$) | 3 | 2 |
| ($131_2$) | 3 | 3 |
| ($132_2$) | 3 | 3 |
| ($133_1$) | 3 | 3 |
| ($134_1$) | 3 | 3 |
| ($135_1$) | 3 | 3 |
| ($136_2$) | 3 | 3 |
| ($137_1$) | 3 | 2 |
| ($138_1$) | 3 | 2 |
| ($139_1$) | 3 | 2 |
| ($140_1$) | 3 | 2 |
| ($141_1$) | 3 | 2 |
| ($142_1$) | 3 | 1 |
| ($143_2$) | 3 | 1 |
| ($144_2$) | 3 | 2 |
| ($147_2$) | 3 | 1 |
| ($148_2$) | 3 | 2 |
| ($149_2$) | 2 | 2 |
| ($150_1$) | 3 | 1 |
| ($151_2$) | 3 | 2 |
| ($152_2$) | 3 | 3 |
| ($155_2$) | 2 | 1 |
| ($156_2$) | 3 | 2 |
| ($157_2$) | 3 | 3 |
| ($159_2$) | 3 | 3 |
| ($160_2$) | 3 | 3 |
| ($166_1$) | 3 | 2 |
| ($167_1$) | 3 | 3 |
| ($168_1$) | 3 | 2 |
| ($169_1$) | 3 | 2 |
| ($170_2$) | 3 | 1 |
| ($171_2$) | 3 | 2 |
| ($172_2$) | 3 | 1 |
| ($173_1$) | 3 | 3 |
| ($174_1$) | 3 | 3 |
| ($175_1$) | 3 | 2 |
| ($176_1$) | 3 | 3 |
| ($177_2$) | 3 | 1 |
| ($178_2$) | 3 | 3 |
| ($179_2$) | 3 | 3 |
| ($180_1$) | 3 | 3 |
| ($181_1$) | 3 | 3 |
| ($182_1$) | 3 | 3 |
| ($183_1$) | 3 | 3 |
| ($184_1$) | 3 | 2 |
| ($185_2$) | 3 | 2 |
| ($186_2$) | 3 | 2 |
| ($187_1$) | 3 | 3 |
| ($188_1$) | 3 | 3 |

| Compound No. | | |
|---|---|---|
| (189₁) | 3 | 2 |
| (190₁) | 3 | 2 |
| (191₁) | 3 | 2 |
| (192₂) | 3 | 2 |
| (193₂) | 3 | 3 |
| (194₂) | 3 | 3 |
| (195₁) | 3 | 3 |
| (196₂) | 3 | 2 |
| (197₁) | 2 | 1 |
| (198₁) | 3 | 3 |
| (199₁) | 3 | 2 |
| (200₁) | 3 | 2 |
| (201₁) | 3 | 2 |
| (203₁) | 3 | 3 |
| (204₂) | 3 | 3 |
| (206₁) | 3 | 3 |
| (207₂) | 3 | 3 |
| (209₂) | 3 | 3 |
| (210₂) | 3 | 3 |
| (212₂) | 3 | 3 |
| (213₂) | 3 | 3 |
| (214₂) | 3 | 3 |
| (215₂) | 3 | 3 |
| (216₂) | 3 | 3 |
| (217₂) | 3 | 3 |
| (219₁) | 3 | 3 |
| (220₂) | 3 | 3 |
| (222₁) | 3 | 3 |
| (223₁) | 3 | 3 |
| (225₁) | 3 | 2 |
| (226₁) | 3 | 3 |
| (227₂) | 3 | 3 |
| (228₂) | 3 | 2 |
| (232₁) | 3 | 3 |
| (233₁) | 3 | 3 |
| (235₁) | 3 | 3 |
| (236₁) | 3 | 3 |
| (237₂) | 3 | 3 |
| (238₂) | 3 | 3 |
| (239₂) | 3 | 3 |
| (240₂) | 3 | 3 |
| (241₁) | 3 | 3 |
| (242₁) | 3 | 3 |
| (244₁) | 3 | 2 |
| (245₁) | 3 | 2 |
| (249₂) | 3 | 3 |
| (250₂) | 3 | 3 |
| (251₂) | 3 | 3 |
| (252₂) | 3 | 3 |
| (253₂) | 2 | 3 |
| (254₂) | 3 | 2 |
| (255₂) | 3 | 3 |
| (256₂) | 3 | 3 |
| (259₂) | 3 | 3 |
| (260₂) | 3 | 3 |
| (261₂) | 3 | 3 |
| (262₂) | 3 | 3 |
| (264₁) | 3 | 3 |
| (265₁) | 3 | 3 |
| (266₁) | 3 | 3 |
| (267₁) | 3 | 3 |
| (268₁) | 3 | 3 |
| (269₁) | 3 | 3 |
| (270₁) | 3 | 3 |
| (271₂) | 3 | 3 |
| (272₁) | 3 | 1 |
| (273₁) | 3 | 3 |
| (274₂) | 3 | 3 |
| (C) Neosappiran (Commercial product-comparison) | 2 | 2 |
| (D) Phenkapton (Commercial product-comparison) | 1 | 0 |

NOTES:
(C) Neosappiran W.P.: Parachlorophenyl-parachlorobenzene sulfonate 36% bis (parachlorophnoxy)-methone 14%
(D) Phenkapton: 0,0-diethyl-S-(2,5-dichloro-phenyl-mercaptomethyl)-dithiophosphate

Example 4 a. Insecticidal test against the adult house fly 1 ml of a diluted solution of the prescribed concentration of the particular active compounds, respectively, indicated in Table 4 below, is adsorbed onto filter paper placed in a Petri dish of 9 cm diameter. 10 mature female house flies are then placed in the Petri dish. The dish is placed in an incubator and the temperature is maintained at 28°C. After 24 hours, the number of dead insects is counted and the mortality rate is calculated as a percentage.

The results obtained are given in Table 4 below.

b. Insecticidal test against tobacco cutworm larvae

Leaves of sweet potato dipped in a diluted solution of the particular active compounds of the present invention, respectively, indicated in Table 4 below, are dried and put in a Petri dish of 9 cm diameter. Into the same Petri dish are placed 10 tobacco cut worms at three instar stage. The dish is then placed in an incubator maintained at a temperature of 28°C. 24 hours later, the dead insects are counted, and the mortality rate is calculated as a percentage.

The results obtained are also given in Table 4 below.

TABLE 4

Results of insecticidal efficacy test against house fly and tobacco cutworm

| Compound No. (see Table 6) | a. Mortality rate (in %) of house fly at active compound concentration of | | b. Mortality rate (in %) of tobacco cutworm at active compound concentration of | | |
|---|---|---|---|---|---|
| | 0.1% | 0.01% | 0.1% | 0.03% | 0.01% |
| (3₄) | 100 | 90 | 80 | 50 | |
| (4₄) | 100 | 10 | 80 | 40 | |
| (5₄) | 90 | 10 | | | |
| (11₂) | 90 | 30 | | | |
| (56₄) | 100 | 90 | 100 | 100 | 100 |
| (57₄) | 100 | 40 | 80 | 50 | |
| (59₂) | | | 100 | | |
| (61₂) | 80 | 70 | | | |
| (64₃) | 100 | 30 | 60 | | |
| (65₃) | 100 | | 50 | | |
| (68₃) | 100 | 20 | | | |
| (80₃) | 100 | 100 | 70 | 40 | |
| (81₃) | 100 | 20 | | | |
| (91₄) | 100 | | 100 | 100 | 100 |
| (92₄) | 100 | 50 | 90 | 30 | |
| (94₂) | 80 | | 50 | 30 | |
| (96₂) | 100 | 30 | | | |
| (98₃) | 100 | 100 | | 50 | 10 |
| (99₃) | 100 | 100 | | | |
| (102₃) | 100 | 90 | 50 | | |
| (103₃) | 90 | | | | |
| (109₄) | 100 | 100 | 40 | | |
| (111₁) | 100 | 70 | 40 | | |
| (112₁) | 100 | 50 | | | |
| (113₁) | 100 | 60 | | | |
| (116₁) | 100 | 70 | | | |
| (117₁) | 100 | 80 | | | |
| (123₂) | 100 | 30 | 70 | 20 | |
| (124₂) | 100 | | | | |
| (125₃) | 100 | 60 | 100 | 100 | 100 |
| (126₃) | 100 | 10 | 50 | 10 | |
| (131₃) | | | 100 | 100 | 100 |
| (132₃) | | | 100 | 80 | 50 |
| (135₃) | 100 | 40 | 100 | 100 | 100 |
| (136₃) | 100 | | 100 | | |
| (139₂) | | | 100 | 100 | 100 |
| (173₂) | 100 | 30 | 100 | 100 | 100 |
| (174₂) | 100 | | 100 | | |
| (185₃) | | | 100 | 70 | 50 |

Example 5

Test against rice white tip nematodes

One drop of water containing rice white tip nematodes (*Aphelenchoides besseyi*) is introduced by means of a pipette into a test tube of 1.5 cm diameter and 5 cm height containing 2 ml. of a solution of the particular active compounds, respectfully, indicated in Table 5 below.

The top of the tube is sealed to avoid evaporation.

The tube is placed in an incubator and kept at a temperature of 28°C for 24 hours. The mortality is determined by microscopic examination.

The results obtained are given in Table 5 below.

TABLE 5

Results of efficacy test against rice white tip nematodes

| Compound No. (see Table 6) | Concentration of active compound (parts per million) | Mortality rate (%) |
| --- | --- | --- |
| (3₅) | 10 | 100 |
| (8₃) | 10 | 100 |
| (56₅) | 10 | 100 |
| (60₃) | 10 | 100 |
| (78₃) | 10 | 100 |
| (91₅) | 10 | 100 |
| (94₃) | 10 | 100 |
| (125₄) | 10 | 100 |
| (131₄) | 10 | 100 |
| (135₃) | 10 | 100 |
| (139₃) | 10 | 100 |
| (173₃) | 10 | 100 |
| (185₄) | 10 | 100 |
| (193₃) | 10 | 100 |
| DBCD | 1000 | 100 |

Note: DBCD: dibromomonochloro-propane

The following further examples illustrate, without limitation, the process for producing the particular new compounds of the present invention.

Example 6

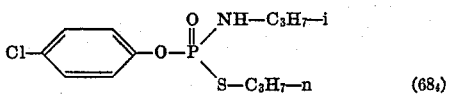

34 g. of potassium hydroxide are dissolved in 250 ml of water, and then 200 ml of dioxan are added to the resulting solution. 85 g of O-(4-chloro-phenyl)-N-isopropyl-amido-thiono-phosphoric acid chloride are added dropwise to this solution while it was stirred at a temperature of 50°C. The stirring is continued for a further hour. Then most of the dioxan is distilled off from the mixture, and 400 ml of water and 300 ml of benzene are added to the concentrate, and the mixture is vigorously shaken. The benzene layer is separated off and the water is distilled off. The residue is dissolved in acetone with heating and the inorganic salt which precipitates is removed by separation (e.g. filtration). The acetone is subsequently distilled off. n-Hexane and toluene are then added to the residue. 60 g of crystals of the potassium salt of O-(4-chloro-phenyl)-N-isopropylamidothionophosphoric acid are thus obtained.

31 g of this potassium salt are dissolved in 100 ml of alcohol and 13 g of n-propyl-bromide are added dropwise to the resulting solution at a temperature of 30–40°C. After stirring for 3 hours at a temperature of 70°C, the reaction mixture is cooled and the inorganic salt is separated by filtration. The alcohol is distilled off and the residue is dissolved in benzene. The benzene solution is washed with a 1 percent aqueous sodium carbonate solution and dried over anhydrous sodium sulfate. The benzene is distilled off and the residue is recrystallized from n-hexane containing a small amount of benzene. 23.6 g. of O-(4-chloro-phenyl)-S-n-propyl-N-isopropyl-phosphoro-amido-thiolate are thus obtained in the form of white crystals having a melting point of 42–43°C.

Example 7

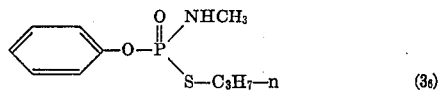

11.2 g of potassium hydroxide are dissolved in 60 ml of water and 60 ml of dioxan are added to the resulting solution. 22.2 g of O-phenyl-N-methyl-amido-thionophosphoric acid chloride are then added dropwise while stirring at a temperature of 30–40°C. After completion of this addition, the reaction mixture is stirred for a further 30 minutes at a temperature of 50°C.

12.3 g of n-propyl-bromide are added dropwise to the mixture and the mixture is stirred over a period of 3 hours at a temperature of 60°C to complete the reaction. After distilling off dioxan, a large amount of water is added to the remaining reaction mixture. The reaction product is extracted with benzene. The benzene layer is washed with water and then with a 1 percent aqueous solution of sodium carbonate and finally dehydrated over anhydrous sodium sulfate. After distilling off the benzene, 17.8 g of O-phenyl-S-n-propyl-N-methyl-phosphoro-amido-thiolate, $n_D^{20}$ 1.5370, is obtained having a boiling point of 145 – 150° C/0.1 mm Hg.

EXAMPLE 8

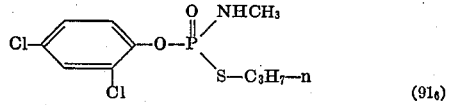

11.2 g of potassium hydroxide are dissolved in 60 ml of water and 60 ml of dioxan are added to the resulting solution. 29.1 g of O-(2,4-dichloro-phenyl)-N-methyl-amido-thionophosphoric acid chloride are added dropwise to the reaction mixture while it is stirred at a temperature of 30–40°C. The mixture is further stirred for an hour, after completion of the addition, at a temperature of 50°C. Dioxan is distilled off from the reaction mixture, the residue is washed with benzene, and finally evaporated to dryness.

The product thus obtained is dissolved in 100 ml of ethyl alcohol. 12.3 g of n-propyl-bromide are added dropwise to the solution at a temperature of 30–40°C. Then the mixture is stirred for 3 hours at a temperature of 70°C. The reacted mixture is cooled and the precipitated inorganic salt is separated by filtration. After distilling off the ethyl alcohol from the filtrate, the residue is dissolved in benzene. The solution is washed with water and then with a 1 percent aqueous solution of sodium carbonate and finally dried over anhydrous sodium sulfate. After distilling off the benzene, the residue is subjected to vacuum distillation to yield 23.5 g of O-(2,4-dichloro-phenyl)-S-n-propyl-N-methyl-phosphoro-amido-thiolate, $n_D^{20}$ 1.5601, boiling at 166–174°C/0.05 mm Hg.

The particular active compounds prepared in Examples 6–8 and other typical compounds of the present invention which are prepared in analogous manner are listed in Table 6 below, in which X$n$, Y$m$, R$^1$ and R$^2$ of formula I above are correspondingly identified.

TABLE 6

| Compound number | $X_n$ | $Y_m$ | $R^1$ | $R^2$ | M.P. (°C.) | B.P. (°C./mm. Hg) | ($n_D^{20}$) |
|---|---|---|---|---|---|---|---|
| (1₂) | H | H | $CH_3$ | $CH_3$ | | 143–148/0.05 | 1.5603 |
| (2₂) | H | H | $CH_3$ | $C_2H_5$ | | 140–149/0.05 | 1.5509 |
| (3₂) | H | H | $CH_3$ | $C_3H_7$-n | | 145–150/0.1 | 1.5370 |
| (4₂) | H | H | $CH_3$ | $C_3H_7$-i | | 135–140/0.1 | 1.5334 |
| (5₂) | H | H | $CH_3$ | $C_4H_9$-n | | 146–150/0.08 | 1.5338 |
| (6₂) | H | H | $CH_3$ | $C_5H_{11}$-i | | 148–150/0.1 | 1.5112 |
| (7₂) | H | H | $CH_3$ | $C_6H_{13}$-n | | 145–154/0.08 | 1.5219 |
| (8₂) | H | H | $CH_3$ | $-CH_2CH=CH_2$ | | 135–136/0.07 | 1.5590 |
| (9₂) | H | H | $CH_3$ | $-CH_2C\equiv CH$ | 69–71 | | |
| (10₂) | H | H | $CH_3$ | $-CH_2CH_2Cl$ | | | 1.5560 |
| (11₂) | H | H | $CH_3$ | $-CH_2CH_2CH_2Cl$ | | 175–176/0.2 | 1.5539 |
| (12₂) | H | H | $CH_3$ | $-CH_2$–⌬ | 71–72 | | |
| (13₂) | H | H | $C_2H_5$ | $C_3H_7$-n | | 153–162/0.15 | 1.5354 |
| (14₂) | H | H | $C_2H_5$ | $C_4H_9$-n | | 145–153/0.1 | 1.5293 |
| (15₂) | H | H | $C_2H_5$ | $C_5H_{11}$-l | | | 1.5229 |
| (16₂) | H | H | $C_2H_5$ | $-CH_2CH=CH_2$ | | | 1.5508 |
| (17₂) | H | H | $C_2H_5$ | $-CH_2$–⌬ | | | 1.5828 |
| (18₂) | H | H | $C_3H_7$-n | $CH_3$ | | 139–146/0.15 | 1.5440 |
| (19₂) | H | H | $C_3H_7$-n | $C_2H_5$ | | 142–143/0.2 | 1.5362 |
| (20₂) | H | H | $C_3H_7$-n | $C_3H_7$-n | | 150–156/0.1 | 1.5308 |
| (21₂) | H | H | $C_3H_7$-n | $C_4H_9$-n | | 140–144/0.05 | 1.5259 |
| (22₂) | H | H | $C_3H_7$-i | $CH_3$ | 62–63 | | |
| (23₂) | H | H | $C_3H_7$-i | $C_2H_5$ | 67–68 | | |
| (24₂) | H | H | $C_3H_7$-i | $C_3H_7$-n | 62–63 | | |
| (25₂) | H | H | $C_3H_7$-i | $C_3H_7$-i | 45–46 | 120–123/0.05 | |
| (26₂) | H | H | $C_3H_7$-i | $C_4H_9$-n | 36–27 | | |
| (27₂) | H | H | $C_3H_7$-i | $C_5H_{11}$-l | | | 1.5101 |
| (28₂) | H | H | $C_3H_7$-i | $C_4H_9$-i | 59–60 | | |
| (29₂) | H | H | $C_3H_7$-i | $C_6H_{13}$-n | | 140–145/0.04 | 1.5119 |
| (30₂) | H | H | $C_3H_7$-i | $-CH_2CH=CH_2$ | 56–58 | | |
| (31₂) | H | H | $C_3H_7$-i | $-CH_2C\equiv CH$ | 75–76 | | |
| (32₂) | H | H | $C_3H_7$-i | $-CH_2CH_2-Cl$ | 39–41 | | |
| (33₂) | H | H | $C_3H_7$-i | $-CH_2CH_2CH_2Cl$ | 43–44 | 153–156/0.05 | |
| (34₂) | H | H | $C_3H_7$-i | $-CH_2$–⌬ | 81–83 | | |
| (35₂) | H | H | $C_4H_9$-n | $CH_3$ | | 150–160/0.1 | 1.5373 |
| (36₂) | H | H | $C_4H_9$-n | $C_2H_5$ | | 143–147/0.05 | 1.5319 |
| (37₂) | H | H | $C_4H_9$-n | $C_3H_7$-n | | 143–145/0.05 | 1.5272 |
| (38₂) | H | H | $C_4H_9$-n | $C_4H_9$-n | | 158–163/0.1 | 1.5229 |
| (39₂) | H | H | $C_4H_9$-i | $CH_3$ | 42–43 | 135–145/0.05 | |
| (40₂) | H | H | $C_4H_9$-i | $C_2H_5$ | 35–36 | 145–150/0.05 | |
| (41₂) | H | H | $C_4H_9$-i | $C_3H_7$-n | 46–47 | 143–145/0.05 | |
| (42₂) | H | H | $C_4H_9$-i | $C_4H_9$-n | 31–32 | 151–154/0.05 | |
| (43₂) | H | H | $C_4H_9$-sec. | $CH_3$ | 44–46 | 135–140/0.05 | |
| (44₂) | H | H | $C_4H_9$-sec. | $C_2H_5$ | 61–63 | | |
| (45₂) | H | H | $C_4H_9$-sec. | $C_3H_7$-n | 63–66 | | |
| (46₂) | H | H | $C_4H_9$-sec. | $C_4H_9$-n | 41–44 | | |
| (47₂) | H | H | $C_6H_{13}$-n | $CH_3$ | | 156–166/0.1 | 1.5271 |
| (48₂) | H | H | $C_6H_{13}$-n | $C_2H_5$ | | 159–165/0.1 | 1.5149 |
| (49₂) | H | H | $C_6H_{13}$-n | $C_3H_7$-n | | 155–160/0.1 | 1.5118 |
| (50₂) | H | H | $C_6H_{13}$-n | $C_4H_9$-n | | 162–168/0.08 | 1.5120 |
| (51₂) | H | H | ⬡(H) | $C_2H_5$ | 95–97 | | |
| (52₂) | H | H | ⬡(H) | $C_3H_7$-n | 85–87 | | |
| (53₂) | H | H | ⬡(H) | $C_4H_9$-n | 84–85 | | |
| (54₂) | 4-Cl | H | $CH_3$ | $CH_3$ | 45–47 | 149–150/0.1 | |
| (55₂) | 4-Cl | H | $CH_3$ | $C_2H_5$ | | 146–148/0.1 | 1.5582 |
| (56₂) | 4-Cl | H | $CH_3$ | $C_3H_7$-n | | 155–160/0.08 | 1.5492 |
| (57₂) | 4-Cl | H | $CH_3$ | $C_4H_9$-n | | 162–170/0.15 | 1.5402 |
| (58₂) | 4-Cl | H | $CH_3$ | $C_5H_{11}$-n | | | 1.5289 |
| (59₂) | 4-Cl | H | $CH_3$ | $C_6H_{13}$-n | | 156–165/0.05 | 1.5319 |
| (60₂) | 4-Cl | H | $CH_3$ | $-CH_2CH=CH_2$ | | 148–152/0.05 | 1.5659 |
| (61₂) | 4-Cl | H | $CH_3$ | $-CH_2CH_2Cl$ | | | 1.5632 |
| (62₂) | 4-Cl | H | $CH_3$ | $-CH_2CH_2CH_2Cl$ | | 197/0.3 | 1.5663 |
| (63₂) | 4-Cl | H | $CH_3$ | $-CH_2$–⌬ | | 176–190/0.04 | 1.5909 |
| (64₂) | 4-Cl | H | $C_2H_5$ | $C_3H_7$-n | | 158–160/0.2 | 1.5440 |
| (65₂) | 4-Cl | H | $C_2H_5$ | $C_4H_9$-n | | 160–169/0.07 | 1.5380 |
| (66₂) | 4-Cl | H | $C_3H_7$-i | $CH_3$ | 99–101 | | |
| (67₂) | 4-Cl | H | $C_3H_7$-i | $C_2H_5$ | 73–74 | | |
| (68₂) | 4-Cl | H | $C_3H_7$-i | $C_3H_7$-n | 42–43 | | |
| (69₂) | 4-Cl | H | $C_3H_7$-i | $C_4H_9$-n | | 154–158/0.1 | 1.5318 |
| (70₂) | 4-Cl | H | $C_3H_7$-i | $C_6H_{13}$-n | 36–37 | 155–162/0.06 | |
| (71₂) | 4-Cl | H | $C_3H_7$-i | $-CH_2CH=CH_2$ | 61–62 | | |
| (72₂) | 4-Cl | H | $C_3H_7$-i | $-CH_2C\equiv CH$ | 63–64 | | |
| (73₂) | 4-Cl | H | $C_3H_7$-i | $-CH_2CH_2Cl$ | 54–55 | 158–160/0.07 | |
| (74₂) | 4-Cl | H | $C_3H_7$-i | $-CH_2CH_2CH_2Cl$ | 43–45 | 169–171/0.05 | |
| (75₂) | 4-Cl | H | $C_3H_7$-i | $-CH_2$–⌬ | 98–99 | | |

TABLE 6—Continued

| Compound number | $X_n$ | $Y_m$ | $R^1$ | $R^2$ | M.P. (°C.) | B.P. (°C./mm. Hg) | $(n_D^{20})$ |
|---|---|---|---|---|---|---|---|
| (76₂) | 2-Cl | H | $CH_3$ | $CH_3$ | 75-77 | 147-156/0.05 | |
| (77₂) | 2-Cl | H | $CH_3$ | $C_2H_5$ | | 151-161/0.15 | 1.5601 |
| (78₄) | 2-Cl | H | $CH_3$ | $C_3H_7$-n | | 146-148/0.1 | 1.5529 |
| (79₃) | 2-Cl | H | $CH_3$ | $C_4H_9$-n | | 147-158/0.04 | 1.5480 |
| (80₄) | 2-Cl | H | $C_2H_5$ | $C_3H_7$-n | | 166-175/0.06 | 1.5455 |
| (81₄) | 2-Cl | H | $C_2H_5$ | $C_4H_9$-n | | 151-165/0.03 | 1.5396 |
| (82₂) | 2-Cl | H | $C_3H_7$-i | $CH_3$ | 86-88 | | |
| (83₃) | 2-Cl | H | $C_3H_7$-i | $C_2H_5$ | 63-64 | | |
| (84₂) | 2-Cl | H | $C_3H_7$-i | $C_3H_7$-n | 39-40 | | |
| (85₂) | 2-Cl | H | $C_3H_7$-i | $C_4H_9$-n | 34-35 | | |
| (86₂) | 2-Cl | H | $C_3H_7$-i | $C_6H_{13}$-n | 36-37 | | |
| (87₃) | 4-Cl | H | $C_4H_9$-n | $C_3H_7$-n | | 180-184/0.1 | 1.5345 |
| (88₃) | 4-Cl | H | $C_4H_9$-n | $C_4H_9$-n | | 170-179/0.05 | 1.5308 |
| (89₂) | 2,4-Cl₂ | H | $CH_3$ | $CH_3$ | | 167-168/0.1 | 1.5775 |
| (90₃) | 2,4-Cl₂ | H | $CH_3$ | $C_2H_5$ | | 155-161/0.07 | 1.5682 |
| (91₇) | 2,4-Cl₂ | H | $CH_3$ | $C_3H_7$-n | | 166-174/0.05 | 1.5601 |
| (92₅) | 2,4-Cl₂ | H | $CH_3$ | $C_4H_9$-n | | 168-170/0.1 | 1.5536 |
| (93₃) | 2,4-Cl₂ | H | $CH_3$ | $C_6H_{13}$-n | | 165-173/0.05 | 1.5392 |
| (94₄) | 2,4-Cl₂ | H | $CH_3$ | $-CH_2CH=CH_2$ | | 163-168/0.08 | 1.5747 |
| (95₂) | 2,4-Cl₂ | H | $CH_3$ | $-CH_2C\equiv CH$ | 70-73 | 175-177/0.15 | |
| (96₃) | 2,4-Cl₂ | H | $CH_3$ | $-CH_2CH_2-Cl$ | | | 1.5662 |
| (97₃) | 2,4-Cl₂ | H | $CH_3$ | $-CH_2-\phi$ | | 184-200/0.07 | 1.5931 |
| (98₄) | 2,4-Cl₂ | H | $C_2H_5$ | $C_3H_7$-n | | 167-177/0.05 | 1.5529 |
| (99₄) | 2,4-Cl₂ | H | $C_2H_5$ | $C_4H_9$-n | | 168-177/0.1 | 1.5478 |
| (100₂) | 2,4-Cl₂ | H | $C_3H_7$-i | $CH_3$ | 89-92 | | |
| (101₂) | 2,4-Cl₂ | H | $C_3H_7$-i | $C_2H_5$ | 29-31 | | |
| (102₄) | 2,4-Cl₂ | H | $C_3H_7$-i | $C_3H_7$-n | 37-38 | 157-158/0.1 | |
| (103₄) | 2,4-Cl₂ | H | $C_3H_7$-i | $C_4H_9$-n | 38-39 | 161-167/0.1 | |
| (104₂) | 2,4-Cl₂ | H | $C_3H_7$-i | $C_6H_{13}$-n | | | 1.5270 |
| (105₂) | 2,4-Cl₂ | H | $C_3H_7$-i | $-CH_2CH_2Cl$ | 49-50 | | |
| (106₂) | 2,4,5-Cl₃ | H | $CH_3$ | $CH_3$ | 98-100 | | |
| (107₂) | 2,4,5-Cl₃ | H | $CH_3$ | $C_2H_5$ | 70-71 | | |
| (108₃) | 2,4,5-Cl₃ | H | $CH_3$ | $C_3H_7$-n | | 170-171/0.13 | 1.5705 |
| (109₃) | 2,4,5-Cl₃ | H | $CH_3$ | $C_4H_9$-n | | 182-193/0.1 | 1.5630 |
| (110₂) | 2,4,5-Cl₃ | H | $CH_3$ | $-CH_2CH=CH_2$ | | 174-177/0.1 | 1.5846 |
| (111₂) | 2,4,5-Cl₃ | H | $CH_3$ | $-CH_2CH_2Cl$ | 74-76 | | |
| (112₂) | 2,4,5-Cl₃ | H | $C_3H_7$-i | $CH_3$ | 86-87 | | |
| (113₂) | 2,4,5-Cl₃ | H | $C_3H_7$-i | $C_2H_5$ | 83-85 | | |
| (114₂) | 2,4,5-Cl₃ | H | $C_3H_7$-i | $C_3H_7$-n | 48-49 | | |
| (115₂) | 2,4,5-Cl₃ | H | $C_3H_7$-i | $C_4H_9$-n | 58-59 | | |
| (116₂) | 2,4,5-Cl₃ | H | $C_3H_7$-i | $-CH_2C\equiv CH$ | 90-93 | | |
| (117₂) | 2,4,5-Cl₃ | H | $C_3H_7$-i | $-CH_2CH_2Cl$ | 88-91 | | |
| (118₂) | 2,4,6-Cl₃ | H | $CH_3$ | $CH_3$ | 79-81 | | |
| (119₂) | 2,4,6-Cl₃ | H | $CH_3$ | $C_3H_7$-i | 73-75 | | |
| (120₂) | 2,4,6-Cl₃ | H | $CH_3$ | $C_3H_7$-n | 72-74 | | |
| (121₂) | 2,4,6-Cl₃ | H | $C_2H_5$ | $C_4H_9$-n | 45-48 | 194-196/0.3 | |
| (122₂) | 2,4,6-Cl₃ | H | $C_2H_5$ | $C_2H_5$ | 73-74 | | |
| (123₃) | 2,4,6-Cl₃ | H | $C_2H_5$ | $C_3H_7$-n | 49-52 | 159-161/0.1 | |
| (124₃) | 2,4,6-Cl₃ | H | $C_2H_5$ | $C_4H_9$-n | | 166-167/0.08 | 1.5585 |
| (125₅) | 4-Br | H | $CH_3$ | $C_3H_7$-n | | 156-158/0.08 | 1.5662 |
| (126₄) | 4-Br | H | $CH_3$ | $C_4H_9$-n | | 165-171/0.1 | 1.5574 |
| (127₂) | 4-Br | H | $C_3H_7$-i | $C_3H_7$-n | 56-57 | 165-168/0.1 | |
| (128₂) | 4-Br | H | $C_3H_7$-i | $C_4H_9$-n | 41-42 | 168-173/0.05 | |
| (129₂) | 4-Cl | 3-$CH_3$ | $CH_3$ | $CH_3$ | 74-76 | 156-159/0.1 | |
| (130₃) | 4-Cl | 3-$CH_3$ | $CH_3$ | $C_2H_5$ | | 156-157/0.1 | |
| (131₅) | 4-Cl | 3-$CH_3$ | $CH_3$ | $C_3H_7$-n | 49-52 | 158-163/0.1 | |
| (132₂) | 4-Cl | 3-$CH_3$ | $CH_3$ | $C_4H_9$-n | 40-41 | 165-169/0.1 | |
| (133₂) | 4-Cl | 3-$CH_3$ | $C_3H_7$-i | $C_3H_7$-n | 38-39 | 160-164/0.1 | |
| (134₂) | 4-Cl | 3-$CH_3$ | $C_3H_7$-i | $C_4H_9$-n | | 160-163/0.2 | 1.5322 |
| (135₄) | 6-Cl | 2-$CH_3$ | $CH_3$ | $C_3H_7$-n | | 150-155/0.2 | 1.5335 |
| (136₄) | 6-Cl | 2-$CH_2$ | $CH_3$ | $C_4H_9$-n | | 150-153/0.1 | 1.5284 |
| (137₂) | 6-Cl | 2-$CH_3$ | $C_3H_7$-i | $C_3H_7$-n | 59-61 | 143-152/0.1 | |
| (138₂) | 6-Cl | 2-$CH_3$ | $C_3H_7$-i | $C_4H_9$-n | 53-55 | 146-153/0.1 | |
| (139₄) | 4-Cl | 3,5-$(CH_3)_2$ | $CH_3$ | $C_3H_7$-n | 73-75 | 165-167/0.07 | |
| (140₂) | 4-Cl | 3,5-$(CH_3)_2$ | $CH_3$ | $C_4H_9$-n | 62-64 | 171-175/0.05 | |
| (141₂) | 4-Cl | 3,5-$(CH_3)_2$ | $C_3H_7$-i | $C_3H_7$-n | 60-61 | 166-170/0.08 | |
| (142₂) | 4-Cl | 3,5-$(CH_3)_2$ | $C_3H_7$-i | $C_4H_9$-n | | 162-164/0.04 | 1.5333 |
| (143₃) | H | 4-$CH_3$ | $CH_3$ | $C_3H_7$-n | | 150-160/0.06 | 1.5387 |
| (144₃) | H | 4-$CH_3$ | $CH_3$ | $C_4H_9$-n | | 150-155/0.05 | 1.5341 |
| (145₂) | H | 4-$CH_3$ | $C_2H_5$ | $C_3H_7$-n | | 143-153/0.08 | 1.5331 |
| (146₂) | H | 4-$CH_3$ | $C_2H_5$ | $C_4H_9$-n | | 155-160/0.15 | 1.5285 |
| (147₃) | H | 4-$CH_3$ | $C_3H_7$-i | $C_2H_5$ | 87-89 | | |
| (148₃) | H | 4-$CH_3$ | $C_3H_7$-i | $C_3H_7$-n | 42-44 | | |
| (149₃) | H | 4-$CH_3$ | $C_3H_7$-i | $C_4H_9$-n | 40-41 | | |
| (150₂) | H | 3-$CH_3$ | $CH_3$ | $CH_3$ | | 147-150/0.1 | 1.5550 |
| (151₃) | H | 3-$CH_3$ | $CH_3$ | $C_3H_7$-n | | 136-142/0.05 | 1.5409 |
| (152₃) | H | 3-$CH_3$ | $CH_3$ | $C_4H_9$-n | | 148-155/0.05 | 1.5349 |
| (153₂) | H | 3-$CH_3$ | $C_2H_5$ | $C_3H_7$-n | | 145-155/0.1 | 1.5332 |
| (154₂) | H | 3-$CH_3$ | $C_2H_5$ | $C_4H_9$-n | | 150-155/0.1 | 1.5280 |
| (155₃) | H | 3-$CH_3$ | $C_3H_7$-i | $C_2H_5$ | 59-63 | | |
| (156₃) | H | 3-$CH_3$ | $C_3H_7$-i | $C_3H_7$-n | | 148-155/0.15 | 1.5274 |
| (157₃) | H | 3-$CH_3$ | $C_3H_7$-i | $C_4H_9$-n | | 147-154/0.1 | 1.5228 |
| (158₂) | H | 2-$CH_3$ | $CH_3$ | $CH_3$ | 65-67 | 147-155/0.1 | |
| (159₃) | H | 2-$CH_3$ | $CH_3$ | $C_3H_7$-n | | 138-145/0.08 | 1.5411 |
| (160₃) | H | 2-$CH_3$ | $CH_3$ | $C_4H_9$-n | | 149-157/0.15 | 1.5350 |
| (161₂) | H | 2-$CH_3$ | $C_2H_5$ | $C_3H_7$-n | | 143-147/0.15 | 1.5342 |
| (162₂) | H | 2-$CH_3$ | $C_2H_5$ | $C_4H_9$-n | | 150-162/0.1 | 1.5297 |
| (163₃) | H | 2-$CH_3$ | $C_3H_7$-i | $C_2H_5$ | 57-59 | | |
| (164₂) | H | 2-$CH_3$ | $C_3H_7$-i | $C_3H_7$-n | 52-54 | | |
| (165₂) | H | 2-$CH_3$ | $C_3H_7$-i | $C_4H_9$-n | 57-60 | | |
| (166₂) | H | 4-$C_2H_5$ | $CH_3$ | $C_3H_7$-n | | 153-160/0.05 | 1.5360 |
| (167₃) | H | 4-$C_2H_5$ | $CH_3$ | $C_4H_9$-n | | 150-157/0.04 | 1.5359 |
| (168₂) | H | 4-$C_2H_5$ | $C_2H_5$ | $C_3H_7$-n | | 154-165/0.15 | 1.5290 |
| (169₂) | H | 4-$C_2H_5$ | $C_2H_5$ | $C_4H_9$-n | | 157-165/0.15 | 1.5250 |
| (170₃) | H | 4-$C_2H_5$ | $C_3H_7$-i | $C_2H_5$ | 38-39 | | |
| (171₃) | H | 4-$C_2H_5$ | $C_3H_7$-i | $C_3H_7$-n | 42-43 | | |
| (172₃) | H | 4-$C_2H_5$ | $C_3H_7$-i | $C_4H_9$-n | 24-25 | | |
| (173₄) | H | 2-$C_3H_7$-i | $CH_3$ | $C_3H_7$-n | | 144-153/0.07 | 1.5332 |
| (174₃) | H | 2-$C_3H_7$-i | $CH_3$ | $C_4H_9$-n | | 154-158/0.15 | 1.5285 |
| (175₂) | H | 2-$C_3H_7$-i | $C_3H_7$-i | $C_3H_7$-n | 67-69 | 149-157/0.1 | |
| (176₃) | H | 2-$C_3H_7$-i | $C_3H_7$-i | $C_4H_9$-n | | 144-146/0.08 | 1.5171 |
| (177₃) | H | 2-$C_4H_9$-t | $CH_3$ | $C_3H_7$-n | | 155-166/0.1 | 1.5331 |
| (178₃) | H | 2-$C_4H_9$-t | $CH_3$ | $C_3H_7$-n | | 158-160/0.05 | 1.5289 |

TABLE 6—Continued

| Compound number | $X_n$ | $Y_m$ | $R^1$ | $R^2$ | M.P. (°C.) | B.P. (°C./ mm. Hg) | $(n_D^{20})$ |
|---|---|---|---|---|---|---|---|
| (179₃) | H | 4-C₄H₉-t | CH₃ | C₄H₉-n | .......... | 158-161/0.04 | 1.5257 |
| (180₂) | H | 4-C₄H₉-t | CH₃ | —CH₂CH=CH₂ | .......... | 171-174/0.1 | 1.5401 |
| (181₃) | H | 4-C₄H₉-t | C₂H₅ | C₃H₇-n | .......... | 153,158-0.1 | 1.5231 |
| (182₂) | H | 4-C₄H₉-t | C₂H₅ | C₄H₉-n | .......... | 058-159/0.05 | 1.5219 |
| (183₂) | H | 4-C₄H₉-t | C₃H₇-i | C₃H₇-n | .......... | 153-159/0.1 | 1.5188 |
| (184₂) | H | 4-C₄H₉-t | C₃H₇-i | C₄H₉-n | .......... | 158-161/0.07 | 1.5164 |
| (185₃) | H | 2,4-(CH₃)₂ | CH₃ | C₃H₇-n | .......... | 142-145/0.07 | 1.5398 |
| (186₃) | H | 2,4-(CH₃)₂ | CH₃ | C₄H₉-n | .......... | 158-161/0.1 | 1.5322 |
| (187₂) | H | 2,4-(CH₃)₂ | C₃H₇-i | C₃H₇-n | 35-36 | .......... | .......... |
| (188₂) | H | 2,4-(CH₃)₂ | C₃H₇-i | C₄H₉-n | 55-56 | .......... | .......... |
| (189₂) | H | 3,4-(CH₃)₂ | CH₃- | C₃H₇-n | .......... | 153-160/0.07 | 1.5420 |
| (190₂) | H | 3,4-(CH₃)₂ | CH₃- | C₄H₉-n | .......... | 165-166/0.12 | 1.5362 |
| (191₂) | H | 3,4-(CH₃)₂ | C₃H₇-i | C₃H₇-n | .......... | 158-162/0.2 | 1.5275 |
| (192₃) | H | 3,4-(CH₃)₂ | C₃H₇-i | C₄H₉-n | 38-39 | .......... | .......... |
| (193₃) | H | 3,5-(CH₃)₂ | CH₃ | C₃H₇-n | .......... | 143-147/0.05 | 1.5380 |
| (194₃) | H | 3,5-(CH₃)₂ | CH₃ | C₄H₉-n | .......... | 157-158/0.13 | 1.5321 |
| (195₃) | H | 3,5-(CH₃)₂ | C₃H₇-i | C₃H₇-n | .......... | 140-141/0.06 | 1.5248 |
| (196₃) | H | 3,5-(CH₃)₂ | C₃H₇-i | C₄H₉-n | 32-34 | .......... | .......... |
| (197₂) | H | 4-CH₃O | CH₃ | C₂H₅ | .......... | 160-163/0.15 | 1.5518 |
| (198₂) | H | 4-CH₃O | CH₃ | C₃H₇-n | .......... | 165-169/0.1 | 1.5459 |
| (199₂) | H | 4-CH₃O | CH₃ | C₄H₉-n | .......... | 171-174/0.15 | 1.5392 |
| (200₂) | H | 4-CH₃O | C₃H₇-i | C₃H₇-n | 63-64 | .......... | .......... |
| (201₂) | H | 4-CH₃O | C₃H₇-i | C₄H₉-n | 53-55 | .......... | .......... |
| (202₂) | 3-Cl | H | CH₃ | C₂H₅ | .......... | 153-160/0.15 | 1.5561 |
| (203₂) | 3-Cl | H | CH₃ | C₃H₇-n | .......... | 150-154/0.1 | 1.5492 |
| (204₂) | 3-Cl | H | CH₃ | C₄H₉-n | .......... | 154-158/0.1 | 1.5424 |
| (205₂) | 3-Cl | H | C₃H₇-iso | C₂H₅ | .......... | 150,153/0.1 | 1.5408 |
| (206₂) | 3-Cl | H | C₃H₇-iso | C₃H₇-n | .......... | 142-146/0.07 | 1.5350 |
| (207₂) | 3-Cl | H | C₃H₇-iso | C₄H₉-n | .......... | 148-152/0.05 | 1.5301 |
| (208₂) | 4-Cl | H | C₄H₉-sec. | C₂H₅ | 63-65 | .......... | .......... |
| (209₂) | 4-Cl | H | C₄H₉-sec. | C₃H₇-n | 48-49 | 155-164/0.07 | .......... |
| (210₂) | 4-Cl | H | C₄H₉-sec. | C₄H₉-n | .......... | 150-161/0.05 | 1.5280 |
| (211₂) | 2,4-Cl₂ | H | C₄H₉-sec. | C₂H₅ | .......... | 160-168/0.05 | 1.5408 |
| (212₂) | 2,4-Cl₂ | H | C₄H₉-sec. | C₃H₇-n | .......... | 162-166/0.05 | 1.5405 |
| (213₃) | 2,4-Cl₂ | H | C₄H₉-sec. | C₄H₉-n | .......... | 165-172/0.08 | 1.5383 |
| (214₃) | 2,6-Cl₂ | H | CH₃ | C₃H₇-n | 73-75 | 166-170/0.15 | .......... |
| (215₃) | 2,6-Cl₂ | H | CH₃ | C₄H₉-n | 60-62 | 177-181/0.2 | .......... |
| (216₃) | 2,6-Cl₂ | H | C₃H₇-iso | C₃H₇-n | 94-96 | .......... | .......... |
| (217₃) | 2,6-Cl₂ | H | C₃H₇-iso | C₂H₅ | 67-69 | 154-160/0.05 | .......... |
| (218₂) | 2,4,6-Cl₃ | H | C₃H₇-iso | C₂H₅ | 109-110 | .......... | .......... |
| (219₂) | 2,4,6-Cl₃ | H | C₃H₇-iso | C₃H₇-n | 80-82 | .......... | .......... |
| (220₃) | 2,4,6-Cl₃ | H | C₃H₇-iso | C₄H₉-n | 72-74 | .......... | .......... |
| (221₂) | 2-Cl | 4-CH₃ | CH₃ | C₂H₅ | .......... | 160-169/0.1 | 1.5561 |
| (222₂) | 2-Cl | 4-CH₃ | CH₃ | C₃H₇-n | .......... | 165-169/0.1 | 1.5497 |
| (223₂) | 2-Cl | 4-CH₃ | CH₃ | C₄H₉-n | .......... | 161-164/0.15 | 1.5439 |
| (224₂) | 2-Cl | 4-CH₃ | C₃H₇-iso | C₂H₅ | 49-50 | 155-168/0.15 | .......... |
| (225₂) | 2-Cl | 4-CH₃ | C₃H₇-iso | C₃H₇-n | .......... | 169-176/0.2 | 1.5343 |
| (226₂) | 2-Cl | 4-CH₃ | C₃H₇-iso | C₄H₉-n | .......... | 160-167/0.1 | 1.5303 |
| (227₃) | 2,6-Cl₂ | 4-CH₃ | CH₃ | C₃H₇-n | .......... | 176-178/0.2 | 1.5640 |
| (228₃) | 2,6-Cl₂ | 4-CH₃ | CH₃ | C₄H₉-n | .......... | 183-186/0.15 | 1.5578 |
| (229₂) | 2,6-Cl₂ | 4-CH₃ | C₃H₇-iso | C₃H₇-iso | 78-79 | .......... | .......... |
| (230₂) | 2,6-Cl₂ | 4-CH₃ | C₃H₇-iso | C₄H₉-n | 86-87 | .......... | .......... |
| (231₂) | 2,4-Cl₂ | 6-CH₃ | CH₃ | C₂H₅ | 49-51 | .......... | .......... |
| (232₂) | 2,4-Cl₂ | 6-CH₃ | CH₃ | C₃H₇-n | 36-37 | .......... | .......... |
| (233₂) | 2,4-Cl₂ | 6-CH₃ | CH₃ | C₄H₉-n | 49.5-51.5 | .......... | .......... |
| (234₂) | 2,4-Cl₂ | 6-CH₃ | C₃H₇-iso | C₂H₅ | 67-69 | 141-146/0.05 | .......... |
| (235₂) | 2,4-Cl₂ | 6-CH₃ | C₃H₇-iso | C₃H₇-n | 68-70 | 146-150/0.05 | .......... |
| (236₂) | 2,4-Cl₂ | 6-CH₃ | C₃H₇-iso | C₄H₉-n | .......... | 158-165/0.05 | 1.5412 |
| (237₂) | 2-Cl | 4-C₄H₉-tert. | CH₃ | C₃H₇ | .......... | 170-172/0.25 | 1.5376 |
| (238₃) | 2-Cl | 4-C₄H₉-tert. | CH₃ | C₄H₉-n | .......... | 169-170/0.15 | 1.5332 |
| (239₂) | 2-Cl | 4-C₄H₉-tert. | C₃H₇-iso | C₃H₇-n | 74-76 | .......... | .......... |
| (240₃) | 2-Cl | 4-C₄H₉-tert. | C₃H₇-iso | C₄H₉-n | .......... | 163-165/0.05 | 1.5231 |
| (241₂) | H | 2-C₄H₉-sec. | CH₃ | C₃H₇-n | .......... | 148-156/0.05 | 1.5298 |
| (242₂) | H | 2-C₄H₉-sec. | CH₃ | C₄H₉-n | .......... | 160-168/0.06 | 1.5259 |
| (243₂) | H | 2-C₄H₉-sec. | C₃H₇-iso | C₂H₅ | .......... | 155-160/0.1 | 1.5224 |
| (244₂) | H | 2-C₄H₉-sec. | C₃H₇-iso | C₃H₇-n | .......... | 158-162/0.1 | 1.5180 |
| (245₂) | H | 2-C₄H₉-sec. | C₃H₇-iso | C₄H₉-n | .......... | 159-169/0.1 | 1.5152 |
| (246₁) | H | 4-C₄H₉-tert. | C₄H₉-n | C₃H₇-n | .......... | 169-178/0.2 | 1.5171 |
| (247₁) | H | 4-C₄H₉-tert. | C₄H₉-n | C₄H₉-n | .......... | 149-159/0.07 | 1.5156 |
| (248₂) | H | 4-C₄H₉-tert. | C₄H₉-sec. | C₂H₅ | 65-66 | .......... | .......... |
| (249₃) | H | 4-C₄H₉-tert. | C₄H₉-sec. | C₃H₇-n | .......... | 157-165/0.08 | 1.5172 |
| (250₃) | H | 4-C₄H₉-tert. | C₄H₉-sec. | C₄H₉-n | .......... | 172-178/0.2 | 1.5149 |
| (251₃) | H | 3-CH₃,6-C₃H₇-iso | CH₃ | C₃H₇-n | .......... | 152-160/0.07 | 1.5307 |
| (252₃) | H | 3-CH₃,6-C₃H₇-iso | CH₃ | C₄H₉-n | .......... | 161-170/0.2 | 1.5261 |
| (253₃) | H | 3-CH₃,6-C₃H₇-iso | C₃H₇-iso | C₃H₇-n | 56-58 | 150-156/0.1 | .......... |
| (254₃) | H | 3-CH₃,6-C₃H₇-iso | C₃H₇-iso | C₄H₉-n | 40-42 | 146-147/0.05 | .......... |
| (255₃) | H | 2-CH₃O | CH₃ | C₃H₇-n | .......... | 162-168/0.1 | 1.5473 |
| (256₃) | H | 2-CH₃O | CH₃ | C₄H₉-n | .......... | 173-175/0.08 | 1.5412 |
| (257₂) | H | 2-CH₃O | C₃H₇-iso | C₃H₇-n | 52-53 | 170-178/0.1 | .......... |
| (258₂) | H | 2-CH₃O | C₃H₇-iso | C₄H₉-n | 37-38 | .......... | .......... |
| (259₃) | H | 2-C₃H₇O-iso | CH₃ | C₃H₇-n | .......... | 165-175/0.05 | 1.5310 |
| (260₃) | H | 2-C₃H₇O-iso | CH₃ | C₄H₉-n | .......... | 160-168/0.1 | 1.5270 |
| (261₃) | H | 2-C₃H₇O-iso | C₃H₇-iso | C₃H₇-n | .......... | 150-155/0.07 | 1.5199 |
| (262₃) | H | 2-C₃H₇O-iso | C₃H₇-iso | C₄H₉-n | .......... | 165-170/0.07 | 1.5161 |
| (263₂) | 2,6-Cl₂ | 4-C₄H₉-tert. | CH₃ | C₃H₇-n | .......... | 175-183/0.1 | 1.5501 |
| (264₂) | 2,6-Cl₂ | 4-C₄H₉-tert. | CH₃ | C₄H₉-n | .......... | 170-176/0.1 | 1.5457 |
| (265₂) | 4-Br | H | C₄H₉-sec. | C₃H₇-n | 46-48 | 168-174/0.15 | .......... |
| (266₂) | 4-Br | H | C₄H₉-sec. | C₄H₉-n | .......... | 171-172/0.18 | 1.5120 |
| (267₂) | 4-Cl | 3-CH₃ | C₄H₉-sec. | C₃H₇-n | 58-59 | 168-174/0.07 | .......... |
| (268₂) | 4-Cl | 3-CH₃ | C₄H₉-sec. | C₄H₉-n | 48-49 | 169-176/0.15 | .......... |
| (269₂) | 4-Cl | 3,5-(CH₃)₂ | C₄H₉-sec. | C₃H₇-n | 81-83 | 174-180/0.1 | .......... |
| (270₂) | 4-Cl | 3,5-(CH₃)₂ | C₄H₉-sec. | C₄H₉-n | .......... | 168-171/0.07 | 1.5319 |
| (271₂) | H | H | CH₃ | —CH₂CH₂—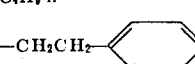 | .......... | 191-197/0.15 | 1.5794 |
| (272₂) | H | H | C₃H₇-iso | —CH₂CH₂—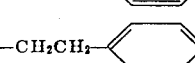 | 80-82 | 183-193/0.1 | .......... |
| (273₂) | 4-Cl | H | CH₃ | —CH₂CH₂—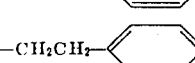 | .......... | 190-200/0.1 | 1.5799 |
| (274₃) | 2,4-Cl₂ | H | CH₃ | —CH₂CH₂—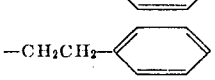 | .......... | 190-210/0.1 | 1.5835 |

Typical preferred compounds of the present invention include:

(3) O-phenyl-S-n-propyl-N-methyl-phosphoro-amido-thiolate
(16) O-phenyl-S-allyl-N-ethyl-phosphoro-amido-thiolate
(32) O-phenyl-S-2-chloroethyl-N-iso-propyl-phosphoro-amido-thiolate
(34) O-phenyl-S-benzyl-N-iso-propyl-phosphoro-amido-thiolate
(51) O-phenyl-S-ethyl-N-cyclohexyl-phosphoro-amino thiolate
(56) O-(4-chloro-phenyl)-S-n-propyl-N-methyl-phosphoro-amido-thiolate
(90) O-(2,4-dichloro-phenyl)-S-ethyl-N-methyl-phosphoro-amido-thiolate
(109) O-(2,4,5-trichloro-phenyl)-S-n-buty-N-methyl-phosphoro-amido-thiolate
(125) O-(4-bromo-phenyl)-S-n-propyl-N-methyl-phosphoro-amido-thiolate
(143) O-(4-methyl-phenyl)-S-n-propyl-N-methyl-phosphoro-amido-thiolate
(199) O-(4-methoxy-phenyl)-S-n-butyl-N-methyl-phosphoro-amido-thiolate
(136) O-(2-methyl-6-chloro-phenyl)-S-n-butyl-N-methyl-phosphoro-amido-thiolate
(131) O-(3-methyl-4-chloro-phenyl)-S-n-propyl-N-methyl-phosphoro-amido-thiolate
(193) O-(3,5-dimethyl-phenyl)-S-n-propyl-N-methyl-phosphoro-amido-thiolate
(140) O-(4-chloro-3,5-dimethyl-phenyl)-S-n-butyl-N-methyl-phosphoro-amido-thiolate
(234) O-(2,4-dichloro-6-methyl-phenyl)-S-ethyl-N-iso-propyl-phosphoro-amido-thiolate.

It will be realized by the artisan that all of the foregoing compounds contemplated by the present invention possess the desired fungicidal properties, and additionally insecticidal and acaricidal, i.e. arthropodicidal, and nematocidal properties, as well as a comparatively low toxicity toward warm-blooded creatures and a concomitantly low phytotoxicity with respect to higher plants, enabling such compounds to be used with correspondingly favorable compatibility with respect to warm-blooded creatures and higher plants for more effective control and/or elimination of fungi, arthropods and nematodes by selective application of such compounds to such fungi, arthropods, nematodes and/or their habitat.

It will be appreciated that the instant specification and examples are set forth by way of illustration and not limitation, and that various modifications and changes may be made without departing from the spirit and scope of the present invention which is to be limited only by the scope of the appended claims.

What is claimed is:

1. Phosphoro-amido-thiolate of the formula

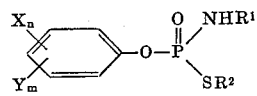

in which $R^1$ is selected from the group consisting of alkyl of one to six carbon atoms and cycloalkyl of five to six ring carbon atoms, $R^2$ is selected from the group consisting of alkyl of one to six carbon atoms, alkenyl of two to six carbon atoms, alkynyl of two to six carbon atoms, chloro-alkyl of one to six carbon atoms, and phenylalkyl having one to two carbon atoms in the alkyl moiety, X is selected from the froup consisting of hydrogen and halo, Y is selected from the group consisting of hydrogen, alkyl of one to four carbon atoms, and alkoxy of one to four carbon atoms, $n$ is a whole number from 1 to 3, and $m$ is a whole number from 1 to 2.

2. Compound according to claim 1 wherein $R^1$ is selected from the group consisting of $C_{1-5}$ alkyl and cyclohexyl, $R^2$ is selected from the group consisting of $C_{1-5}$ alkyl, $C_{2-5}$ alkenyl, $C_{2-5}$ alkynyl, chloro-$C_{1-5}$alkyl, and benzyl, phenethyl X is selected from the group consisting of hydrogen, chloro, and bromo, Y is selected from the group consisting of hydrogen, $C_{1-3}$ alkyl, and $C_{1-3}$ alkoxy, $n$ is 1–3, and $m$ is 1–2.

3. Compound according to claim 1 wherein $R^1$ is selected from the group consisting of $C_{1-4}$alkyl and cyclohexyl, $R^2$ is selected from the gruoup consisting of $C_{1-4}$alkyl, $C_{3-4}$alkenyl, $C_{3-4}$ alkynyl, chloro-$C_{1-4}$ alkyl, and benzyl, phenethyl X is selected from the group consisting of hydrogen, chloro, and bromo, Y is selected from the group consisting of hydrogen, $C_{1-2}$ alkyl, and $C_{1-2}$ alkoxy, $n$ is 1–3, and $m$ is 1–2.

4. Compound according to claim 1 wherein such compound is O-phenyl-S-n-propyl-N-methyl-phosphoro-amido-thiolate of the formula

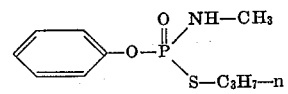

5. Compound according to claim 1 wherein such compound is O-phenyl-S-allyl-N-ethyl-phosphoro-amido-thiolate of the formula

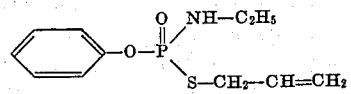

6. Compound according to claim 1 wherein such compound is O-phenyl-S-2-chloroethyl-N-iso-propyl-phosphoro-amido-thiolate of the formula

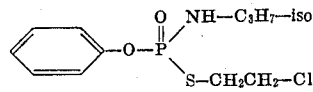

7. Compound according to claim 1 wherein such compound is O-phenyl-S-benzyl-N-iso-propyl-phosphoro-amido-thiolate of the formula

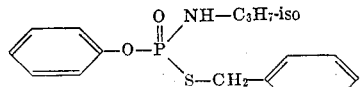

8. Compound according to claim 1 wherein such compound is O-phenyl-S-ethyl-N-cyclohexyl-phosphoro-amido thiolate of the formula

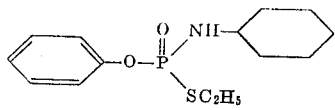

9. Compound according to claim 1 wherein such compound is O-(4-chloro-phenyl)-S-n-propyl-N-methyl-phosphoro-amido-thiolate of the formula

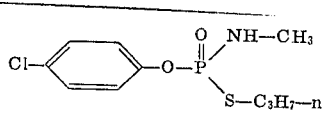

10. Compound according to claim 1 wherein such compound is O-(2,4-dichloro-phenyl)-S-ethyl-N-methyl-phosphoro-amido-thiolate of the formula

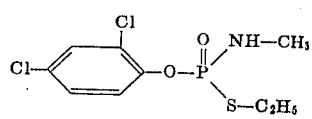

11. Compound according to claim 1 wherein such compound is O-(2,4,5-trichloro-phenyl)-S-n-butyl-N-methyl-phosphoro-amido-thiolate of the formula

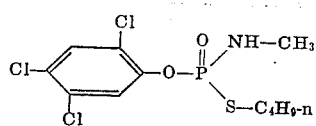

12. Compound according to claim 1 wherein such compound is O-(4-bromo-phenyl)-S-n-propyl-N-methyl-phosphoro-amido-thiolate of the formula

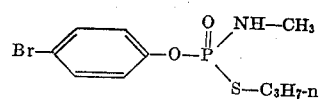

13. Compound according to claim 1 wherein such compound is O-(4-methyl-phenyl)-S-n-propyl-N-methyl-phosphoro-amido-thiolate of the formula

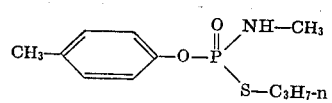

14. Compound according to claim 1 wherein such compound is O-(4-methoxy-phenyl)-S-n-butyl-N-methyl-phosphoro-amido-thiolate of the formula

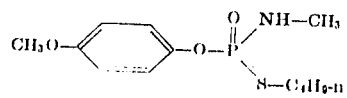

15. Compound according to claim 1 wherein such compound is O-(2-methyl-6-chloro-phenyl)-S-n-butyl-N-methyl-phosphoro-amido-thiolate of the formula.

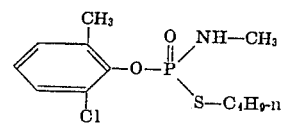

16. Compound according to claim 1 wherein such compound is O-(3-methyl-4-chloro-phenyl)-S-n-propyl-N-methyl-phosphoro-amido-thiolate of the formula

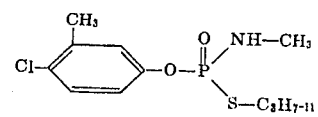

17. Compound according to claim 1 wherein such compound is O-(3,5-dimethyl-phenyl)-S-n-propyl-N-methyl-phosphoro-amido-thiolate of the formula.

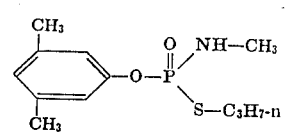

18. Compound according to claim 1 wherein such compound is O-(4-chloro-3,5-dimethyl-phenyl)-S-n-butyl-N-methyl-phosphoro-amido-thiolate of the formula.

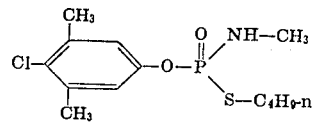

19. Compound according to claim 1 wherein such compound is O-(2,4-dichloro-6-methyl-phenyl)-S-ethyl-N-iso-propyl-phosphoro-amido-thiolate of the formula

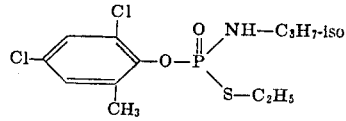

* * * * *